(12) United States Patent
Kalack

(10) Patent No.: US 8,757,699 B2
(45) Date of Patent: Jun. 24, 2014

(54) RAISABLE CANOPY SYSTEM FOR A TRUCK

(76) Inventor: Dennis Kalack, Lantzville (CA)

(*) Notice: Subject to any disclaimer, the term of this patent is extended or adjusted under 35 U.S.C. 154(b) by 231 days.

(21) Appl. No.: 13/153,773

(22) Filed: Jun. 6, 2011

(65) Prior Publication Data

US 2011/0304171 A1 Dec. 15, 2011

Related U.S. Application Data

(60) Provisional application No. 61/354,963, filed on Jun. 15, 2010, provisional application No. 61/423,480, filed on Dec. 15, 2010.

(51) Int. Cl.
B60P 7/02 (2006.01)

(52) U.S. Cl.
USPC .................................. 296/100.01; 296/100.17

(58) Field of Classification Search
USPC ............ 296/168, 176, 156, 159, 157, 100.08, 296/100.07, 100.01, 100.06, 100.09, 100.1
See application file for complete search history.

(56) References Cited

U.S. PATENT DOCUMENTS

| 1,897,383 | A | * | 2/1933 | Burgoyne | 212/180 |
|---|---|---|---|---|---|
| 2,696,977 | A | * | 12/1954 | Baldridge et al. | 366/192 |
| 3,489,456 | A | | 1/1970 | Klanke | |
| 3,954,296 | A | | 5/1976 | Patnode | |
| 4,101,162 | A | | 7/1978 | Koehn | |
| 4,335,916 | A | | 6/1982 | Gutgsell | |
| 4,756,571 | A | | 7/1988 | Lake | |
| 5,127,701 | A | | 7/1992 | Miller | |
| 5,131,712 | A | | 7/1992 | Heinz | |
| 5,213,390 | A | * | 5/1993 | Borchers | 296/165 |
| 5,366,266 | A | | 11/1994 | Harbison | |
| 5,385,377 | A | | 1/1995 | Girard | |
| 5,558,392 | A | | 9/1996 | Young | |
| 5,595,418 | A | | 1/1997 | Medlin | |
| 5,951,095 | A | * | 9/1999 | Herndon | 296/165 |
| 6,076,881 | A | | 6/2000 | Tucker | |
| 6,234,559 | B1 | | 5/2001 | Block et al. | |
| 6,543,834 | B2 | | 4/2003 | Sisson | |
| 6,616,210 | B1 | * | 9/2003 | Massey | 296/100.1 |
| 6,641,200 | B2 | | 11/2003 | Rusu | |
| 6,663,167 | B2 | * | 12/2003 | Phillips et al. | 296/165 |
| 6,830,281 | B2 | * | 12/2004 | Hoffman | 296/100.1 |
| 7,093,882 | B2 | | 8/2006 | Lake | |
| 7,281,744 | B1 | | 10/2007 | Schultz | |
| 7,320,494 | B1 | * | 1/2008 | Wilson | 296/100.09 |
| 2008/0277634 | A1 | * | 11/2008 | Helwick | 254/10.5 |

* cited by examiner

Primary Examiner — Glenn Dayoan
Assistant Examiner — Sunsurraye Westbrook
(74) Attorney, Agent, or Firm — Cameron IP

(57) ABSTRACT

The present invention relates to a raisable canopy system for a truck having a rear box with a first wall and a second wall opposite the first wall. A pair of actuator mounts are mounted to the first wall and the second wall, respectively. A canopy mount is connected to the pair of actuator mounts, is disposed adjacent to one end of the box and extends upwards from the box. A canopy substantially extends over top of the box and pivotally connects to the canopy mount. A pair of actuators are pivotally connected to and extend outwards from the pair of actuator mounts, respectively. The pair of actuators each pivotally connect to the canopy. The pair of actuators are configured to selectively move the canopy from a closed position in which the canopy covers and abuts the box to an open position in which the canopy is angularly spaced-apart from the box.

20 Claims, 15 Drawing Sheets

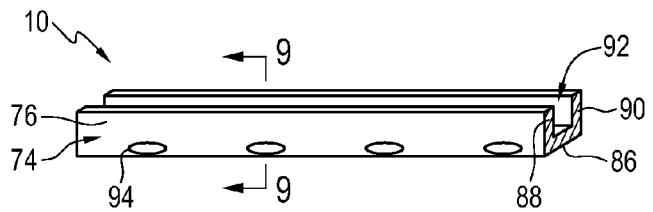
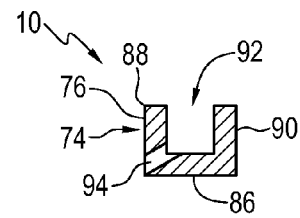
FIG. 8  FIG. 9
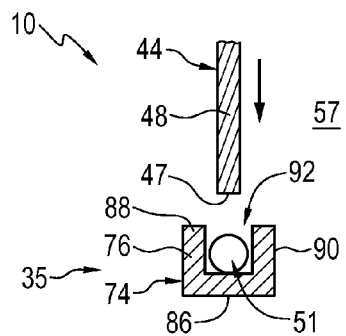
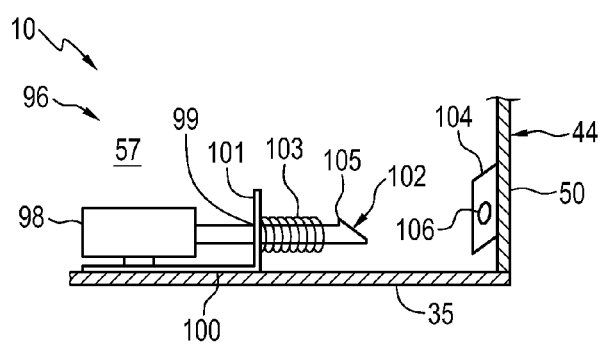
FIG. 10  FIG. 12
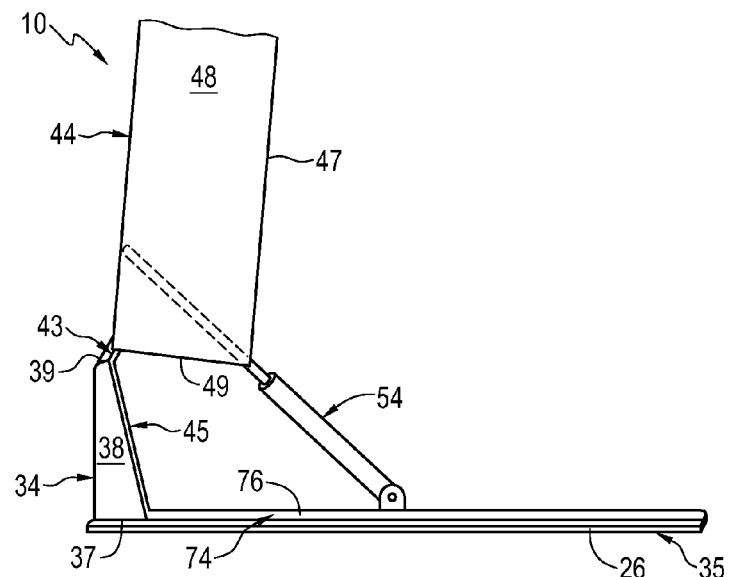
FIG. 11

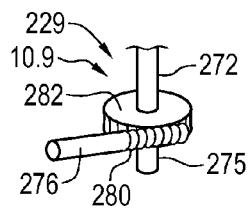
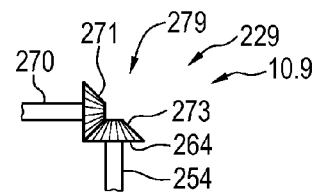
FIG. 31    FIG. 32
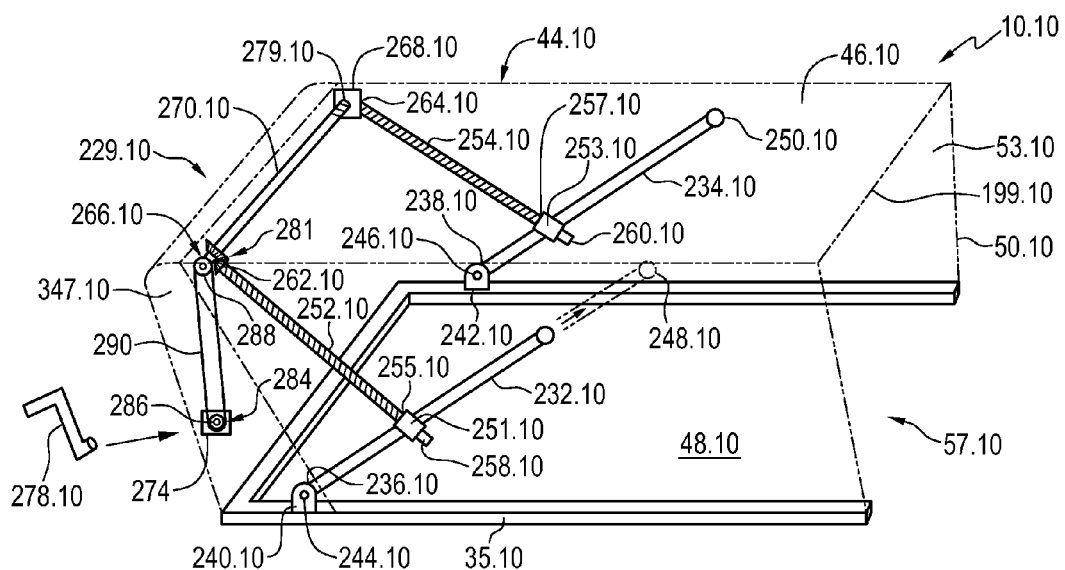
FIG. 33

RAISABLE CANOPY SYSTEM FOR A TRUCK

CROSS REFERENCE TO RELATED APPLICATION

This application claims the benefit of provisional application No. 61/354,963 filed in the United States Patent and Trademark Office on Jun. 15, 2010, the disclosure of which is incorporated herein by reference and priority to which is claimed, and claims the benefit of provisional application No. 61/423,480 filed in the United States Patent and Trademark Office on Dec. 15, 2010, the disclosure of which is incorporated herein by reference and priority to which is claimed.

FIELD OF THE INVENTION

The present invention relates to a raisable canopy system. In particular, the invention relates to a raisable canopy system for a truck.

DESCRIPTION OF THE RELATED ART

It is known per se to provide a raisable canopy system on a truck. However some systems require that the truck be modified or altered in order to install the canopy system. Such alterations may leave permanent markings and damage to the truck and lead to a lowering in the re-sale value of the truck.

Some lifting mechanisms of the canopy systems of the known prior art may be so disposed as to interfere with the storage space within the canopy and truck box and interfere with the access thereto.

Some canopy systems only have a portion that is raisable. This may further inhibit access to the interior and inhibit easy storing.

Lastly existing canopy systems may require a relatively large number of parts and may be relatively expensive to manufacture.

BRIEF SUMMARY OF INVENTION

The present invention provides a raisable canopy system disclosed herein that overcomes the above disadvantages. It is an object of the present invention to provide an improved raisable canopy system.

There is accordingly provided a raisable canopy system for a truck having a rear box. The box includes a first wall and a second wall opposite the first wall. The system includes a pair of actuator mounts mounted to the first wall and the second wall, respectively. The system includes a canopy mount connected to the pair of actuator mounts. The canopy mount is disposed adjacent to one end of the box and extends upwards from the box. The system includes a canopy shaped to substantially extend over top of the box. The canopy is pivotally connected to the canopy mount. The system includes a pair of actuators pivotally connected to and extending outwards from the pair of actuator mounts, respectively. The pair of actuators each pivotally connect to the canopy. The pair of actuators are configured to selectively move the canopy from a closed position in which the canopy covers and abuts the box to an open position in which the canopy is angularly spaced-apart from the box.

According to another aspect, there is provided a raisable canopy system for a truck having a rear box. The box has a pair of spaced-apart walls. The system includes a pair of spaced-apart frames mounted to and overlying the walls, respectively. A canopy mount connects to the frames at one end of the box and extends upwards from the box. The system includes a canopy shaped to substantially extend over the box. The canopy pivotally connects to the canopy mount and has a first end and a second end opposite the first end. A pair of spaced-apart guide rails are mounted to the canopy. The guide rails extend generally from a position adjacent to the first end of the canopy towards the second end of the canopy. The system includes a pair of lift bars moveably engageable with the guide rails and which pivotally connect to the pair of frames, respectively. The lift bars are adjacent to one of the first end and the second end of the canopy. A pair of actuators, each having a first end and a second end, pivotally connect to the pair of frames at the first ends of the actuators. The actuators also pivotally connect to the pair of lift bars at the second ends of the actuators. Selective actuation of the actuators causes the lift bars to raise, move along and push against the guide rails, which in turn causes the canopy to selectively rise.

According to a further aspect, there is provided a raisable canopy system for a truck having a rear box. The box has a pair of spaced-apart walls. The system includes a canopy mount connected to one end of and that extends upwards from the box. The system includes a canopy shaped to substantially extend over the box. The canopy pivotally connects to the canopy mount. The canopy has a roof. The system includes a pair of lift bars having first ends pivotally connecting to respective ones of the pair of frames and second ends disposed adjacent to the roof of the canopy. The second ends of the lift bars operatively abut with and are slidable relative to the canopy. The system includes a pair of actuators, each having a first end and a second end, pivotally connect to the roof of the canopy near the other of the first end and the second end of the canopy at the first ends of the pair of actuators. The actuators also pivotally connect to the pair of lift bars at the second ends of the actuators. Selective actuation of the actuators causes the second ends of the lift bars to raise and move along the canopy adjacent to the roof, which in turn causes the canopy to selectively rise.

According to yet a further aspect, there is provided a raisable canopy system for a truck having a rear box. The box includes a pair of spaced-apart walls. The system includes a pair of spaced-apart frames mounted to and overlying the walls, respectively. A canopy mount is connected to the frames at one end of the box and extends uprwards from the box. The system includes a canopy shaped to substantially extend over the box. The canopy pivotally connects to the canopy mount and has a first end and a second end opposite the first end. A pair of lift bars pivotally connect to the pair of frames, respectively, adjacent to one of the first end and the second end of the canopy. The lift bars extend towards and are movably engageable with the roof of the canopy adjacent to another of the first end and the second end of the canopy. The system includes a plurality of threaded rods connected at one end to a hand crank. The threaded rods operatively connect at one end to a hand crank. The rods are operatively engageable with the lift bars such that selective actuation of the hand crank causes the lift bars to raise, move along and push against the roof of the canopy, which in turn causes the canopy to selectively rise.

BRIEF DESCRIPTION OF DRAWINGS

The invention will be more readily understood from the following description of preferred embodiments thereof given, by way of example only, with reference to the accompanying drawings, in which:

FIG. 8 is a side perspective view of one of the channels shown in FIG. 6, the channel including a plurality of drain holes;

FIG. 9 is a cross-sectional view along lines 9-9 of the channel shown in FIG. 8 with one of the drain holes of the channel being shown in cross-section;

FIG. 10 is a cross-sectional end view of one of the channels of the canopy system's frame, a fragment of the canopy in section and a seal according to one embodiment, showing the manner in which canopy system's frame and the canopy sealably engage;

FIG. 11 is a side view of the canopy system shown in FIG. 1 with the canopy shown in fragment in a fully open position;

FIG. 12 is a side view of a latch mechanism for connecting the canopy to the canopy system's frame according to one embodiment, with both the canopy system's frame and the canopy shown in fragment;

FIG. 31 is a perspective view of a worm gear mechanism for the hand crank system of FIG. 30;

FIG. 32 is a perspective view of an angled drive mechanism for the hand crank system of FIG. 30; and FIG. 33 is a top, side perspective view of a canopy and a hand crank system according to a further additional embodiment of the canopy system, with the canopy and canopy mount being shown in ghost to reveal the interior of the canopy.

DESCRIPTION OF THE PREFERRED EMBODIMENTS

Figure 1:
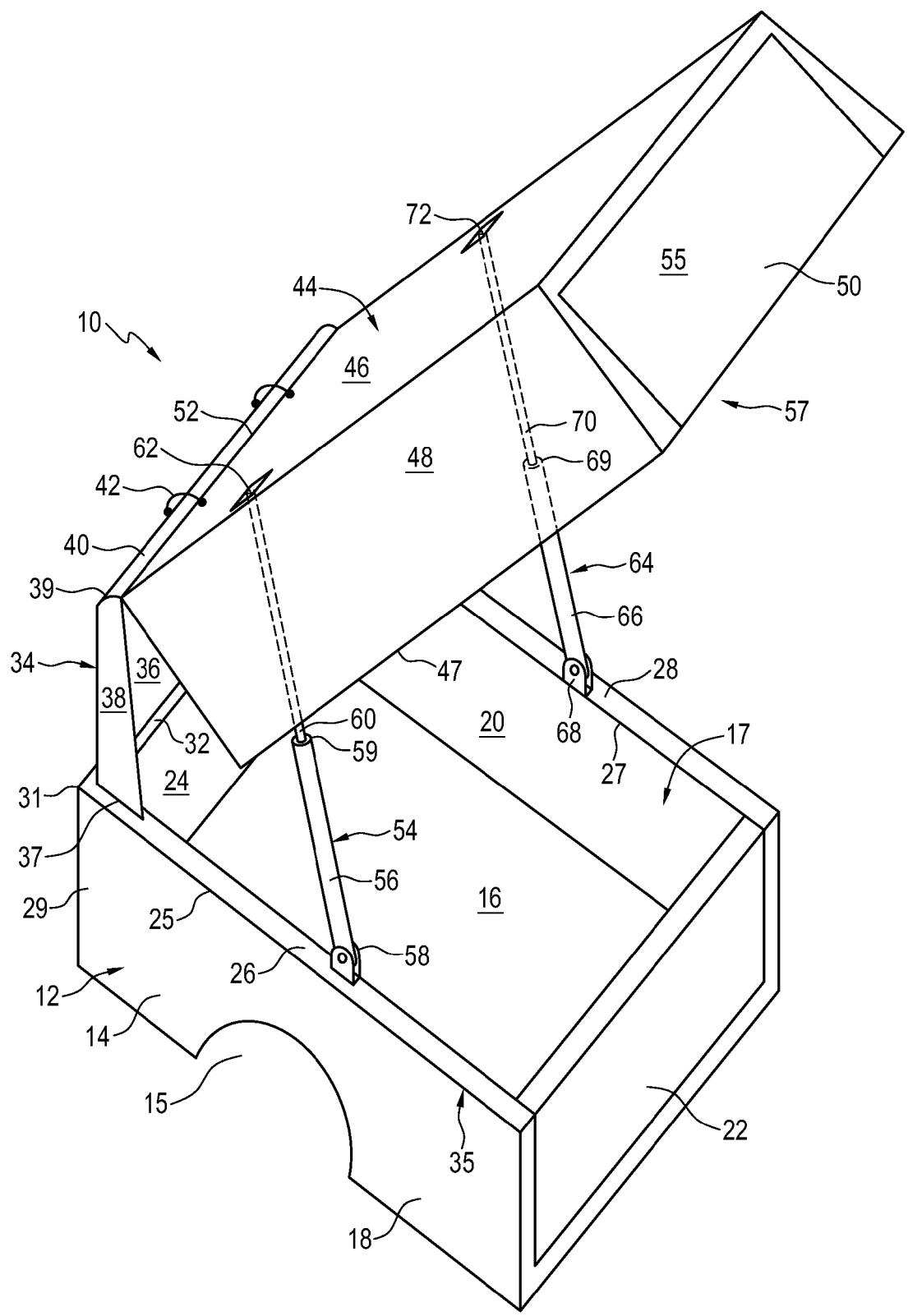
FIG. 1 is a perspective view of a truck box of a truck and a canopy system mounted thereon, the canopy system having a canopy in a partially raised, open position.

Referring to FIG. 1, there is provided a raisable canopy system 10 for a truck 12, only truck box 14 of which is shown. The truck 12 is a conventional pick-up truck in this example.

Figure 2:
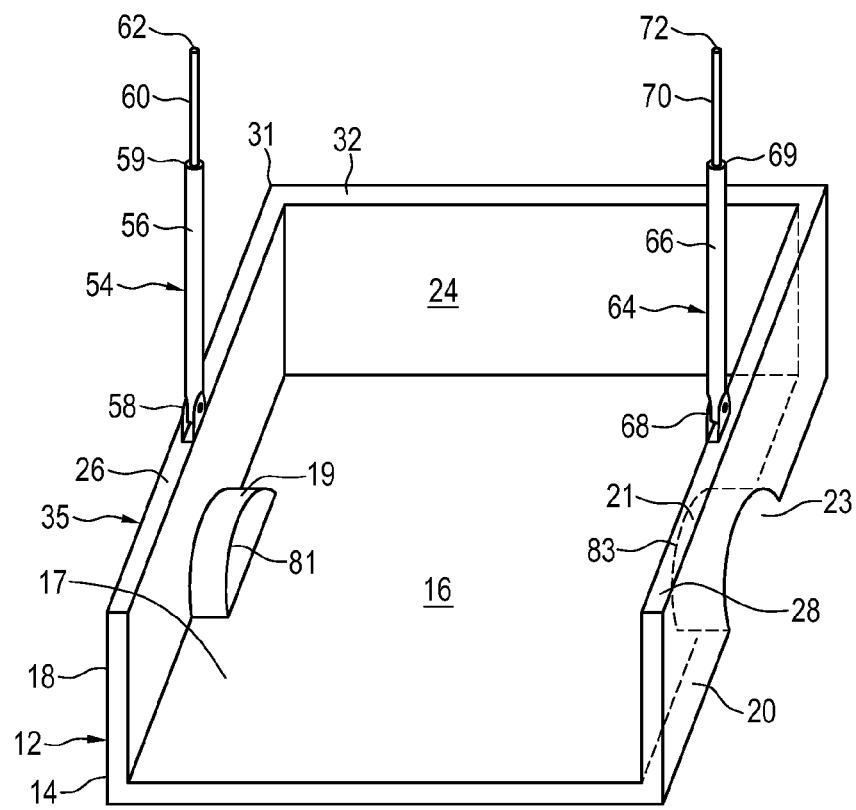
FIG. 2 is a top, rear perspective view of the box of the truck and the canopy system shown in FIG. 1 with the canopy removed.

The box 14 is also conventional and includes a cargo bed 16. As shown in FIG. 2, the box 14 includes a first rear wheel well 19 and a second rear wheel well 21, each extending upwards from the bed 16, from the perspective of FIG. 2. The wheel wells 19 and 21 are arch-shaped and aligned with rear wheels (not shown) of the truck 12 and include opposite facing inner edges 81 and 83. The box 14 includes a first wall, in this example a first side wall 18 and a second wall, in this example a second side wall 20, opposite the first side wall 18. Side walls 18 and 20 each have semi-circular recesses 15 and 23, respectively, as shown in FIGS. 1 and 2, shaped to accommodate the rear wheels of the truck 12. Recesses 15 and 23 align with the wheel wells 19 and 21, respectively.

Referring back to FIG. 1, the box 14 includes a third wall, in this example a front wall 24, disposed at front end 29 of the box 14 that is adjacent to the cab of the truck 12. The box 14 includes a fourth wall in this example a tailgate 22 opposite the front wall 24. The side walls 18 and 20, the front wall 24 and the tailgate 22 all extend upwards from the bed 16, from the perspective of FIG. 1, and enclose a rectangular-shaped interior 17 of the box 14.

Figure 4:
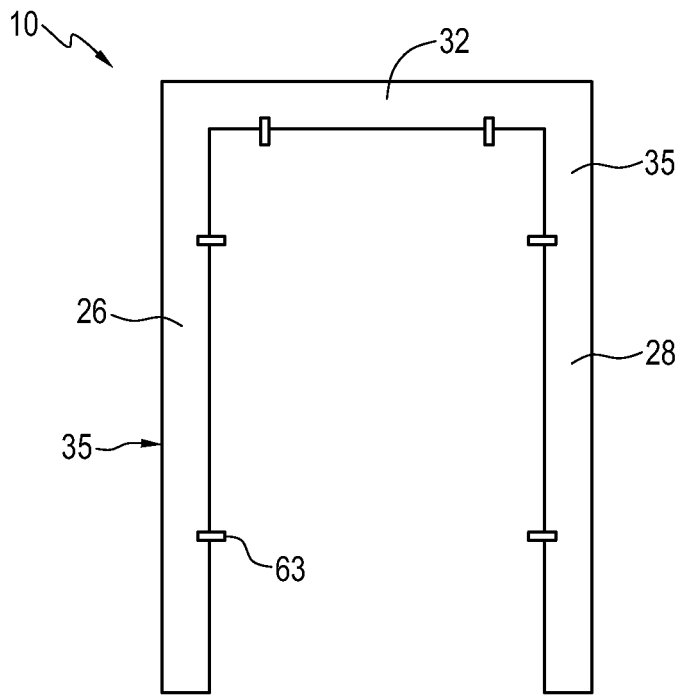
FIG. 4 is a top plan view of a frame of the canopy system and clamp locations for connecting the canopy system to the truck.

Referring to FIGS. 1 and 4, the canopy system 10 in this example includes a u-shaped frame 35 that overlays the tops of side walls 18 and 20 and front wall 24. The canopy system 10 includes a pair of actuator mounts 26 and 28 which in this example are side parts of the frame 35. The actuator mounts extend from front end 29 of the box to the tail gate 22. Actuator mounts 26 and 28 may be referred to as a pair of connected-together frames. As seen in FIG. 1, actuator mount 26 in this example overlays a top edge 25 of the first side wall 18. Actuator mount 28 in this example overlays a top edge 27 of the second side wall 20. The frame 35 also includes portion 32 which in this example connects to and extends between the pair of actuator mounts 26 and 28. Portion 32 overlays and in this example connects to the front wall 24. In one preferred example the frame 35 is made of extruded aluminium though this is not required. For example, the frame 35 alternatively may be made of fiberglass or steel.

Figure 5:
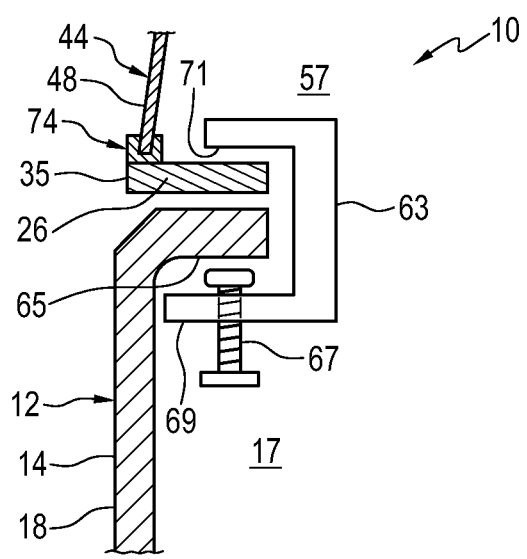
FIG. 5 is an end view of a clamp for connecting the frame of the canopy system to the truck, the frame being shown in cross-section and fragments of the canopy and the box of the truck also being shown in cross-section.

One example of the manner in which the frame 35 and thus the canopy system 10 are connected to the truck 12 is shown in FIGS. 4 and 5. The frame 35 is connected to the truck 12 by way of a plurality of clamps, in this example c-shaped clamps 63. The location of the clamps according to one preferred embodiment is shown in FIG. 4: two spaced-apart clamps are disposed along and connected to actuator mount 26; two spaced-apart clamps are disposed along and connected to actuator mount 28; and two spaced-apart clamps are disposed along and connected to portion 32 of the frame 35.

The configuration of the clamps 63 is shown in FIG. 5, which shows a cross-sectional view of the box 14 of the truck 12 and in this example side wall 18 in fragment. The box 14 includes a flange 65 connected to and extending inwards from the walls 18, 20 and 24, respectively, towards the interior 17 of the box 14 shown in FIG. 1. Each clamp 63 is at least partially disposed within the interior 17. Each clamp 63 has an adjustable screw, in this example an adjustable screw 67, located at one end 69 of the clamp 63, for engaging with the flange 65 of the box 14. Each clamp 63 has another end 71 opposite end 69 for engaging with the frame 35. When adjustable screw 67 is rotated so as to be brought closer to end 71, the clamp 63 frictionally engages with both the frame 35 of the canopy system and box 14 of the box. The canopy system 10 and the box 14 are connectable together thereby. In the alternative the clamp 63 may be reversed, with the adjustable screw 67 engaging the frame 35 and end 71 engaging flange 65. The operation of c-clamps is well known to those skilled in the art and will not be described further.

Figure 6:
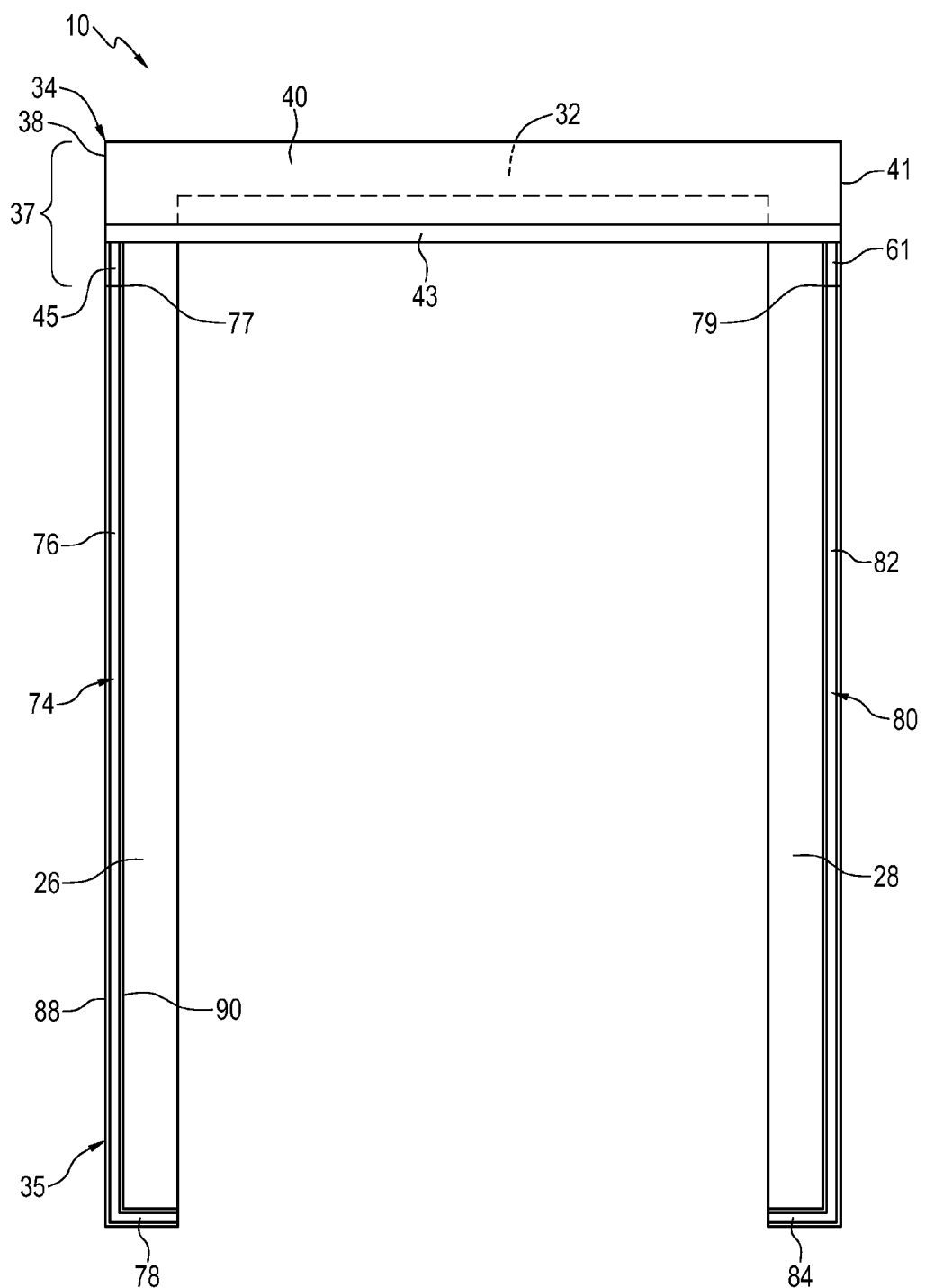
FIG. 6 is a top plan view of the canopy system with the canopy removed, showing channels of the canopy system's frame and a channel of the canopy mount.
Figure 7:
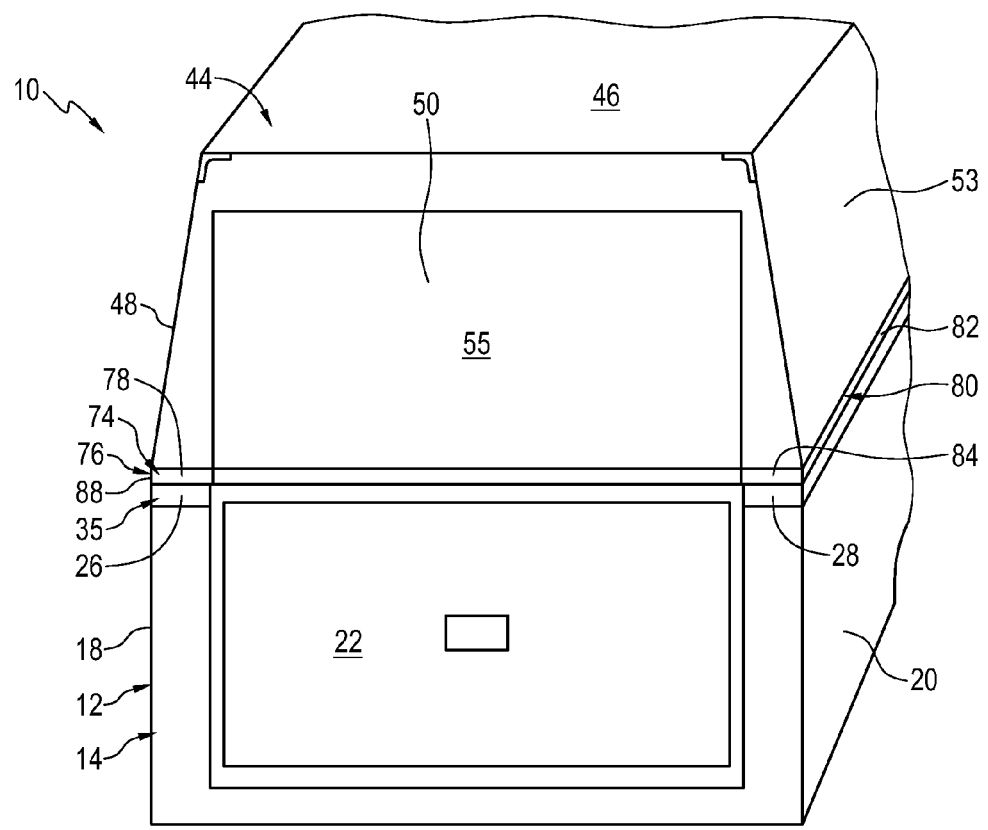
FIG. 7 is a fragmentary perspective view of the truck box and the canopy system shown in FIG. 1 with the canopy shown in the closed position.

The frame 35 includes a pair of spaced-apart channels 74 and 80, as best shown in FIGS. 6 to 9, connected to the actuator mounts 26 and 28, respectively. In this example the channels 74 and 80 are disposed along the periphery of the actuator mounts 26 and 28, respectively. The channels 74 and 80 include elongate portions 76 and 82, respectively. Elongate portion 76 extends substantially parallel to side wall 18 of the box 14 as shown in FIG. 7. Elongate portion 82 extends substantially parallel to side wall 20 of the box 14. Referring to FIG. 6, the elongate portions 76 and 82 abut a canopy mount 34 at ends 77 and 79 of the channels. The channels 74 and 80 include a pair of spaced-apart end portions 78 and 84, respectively, spaced-apart from ends 77 and 79. End portion 78 is connected to and extends from elongate portion 76 towards tailgate 22 as shown in FIG. 7. End portion 84 is connected to and extends from elongate portion 82 towards tailgate 22 as shown in FIG. 7. The end portions 78 and 84 extend substantially parallel to tailgate 22, as also shown in FIG. 7.

The profile of the channels 74 and 80 is best illustrated in FIGS. 8 and 9 which shows channel 74. Only elongate portion 76 will be discussed in detail with the understanding that the channels 74 and 80 have a substantially similar structure with substantially similar parts and functions. Elongate portion 76 has a u-shaped cross-section comprising a base 86 for connecting to the frame 35 shown in FIG. 6. Elongate portion 76 includes a pair of spaced-apart walls 88 and 90 extending upwards from the base 86, from the perspective of FIGS. 8 and 9. The channel 74 has a recess 92 which is rectangular in cross-section in this example and which is located between the base 86 and walls 88 and 90. Wall 88 is disposed on the frame and faces upwards and away from the box 14, as shown in FIG. 7. Wall 90 is so disposed on the frame so as to at least partially face towards interior 57 of the canopy 44 shown in FIG. 1.

Referring to FIG. 8, elongate portion 76 includes a plurality of spaced-apart drain holes 94 that extend from the recess 92 through wall 88. As shown in FIG. 9, the drain holes 94 are in communication with the recess 92 of the channel and, in this example, extend through the wall 88 and at least partially through the base 86. The drain holes 94 are so disposed as to enable water or other debris that may otherwise collect within the recess 92 of the channel 74 to drain out of and away from the channel 74.

Referring now to FIG. 1, the canopy system 10 includes the canopy mount 34, which is aligned adjacent to end 29 of the box 14 in this example. In one preferred embodiment the canopy mount 34 is at least partially made of fiberglass. The canopy mount 34 is connected to the frame 35 and more particularly to actuator mounts 26 and 28 in this example via a pair of spaced-apart struts 38 and 41. Strut 38 is shown in FIG. 1. Strut 41 is partially shown in FIG. 6. Only strut 38 will be described with the understanding that strut 41 is substantially similar in parts and function. Strut 38 has a lower end 37 connected to actuator mount 26 and an upper end 39 opposite the lower end 37. The lower end 37 has a larger width relative to upper end 39 in this example. The canopy mount 34 in this example has an end wall 36 which extends along and is connected to portion 32 of the frame 35. The struts 38 and 41 abut and connect with the end wall 36. The canopy mount 34, and more particularly struts 38 and 41 and end wall 36, extend upwards and away from the box 14, from the perspective of FIG. 1. The canopy mount 34 in this example also includes a cross member 40 connected to and extending between the upper ends 39 of struts 38 and 41. Cross member 40 also connects to and extends adjacent to end wall 36.

Figure 3:
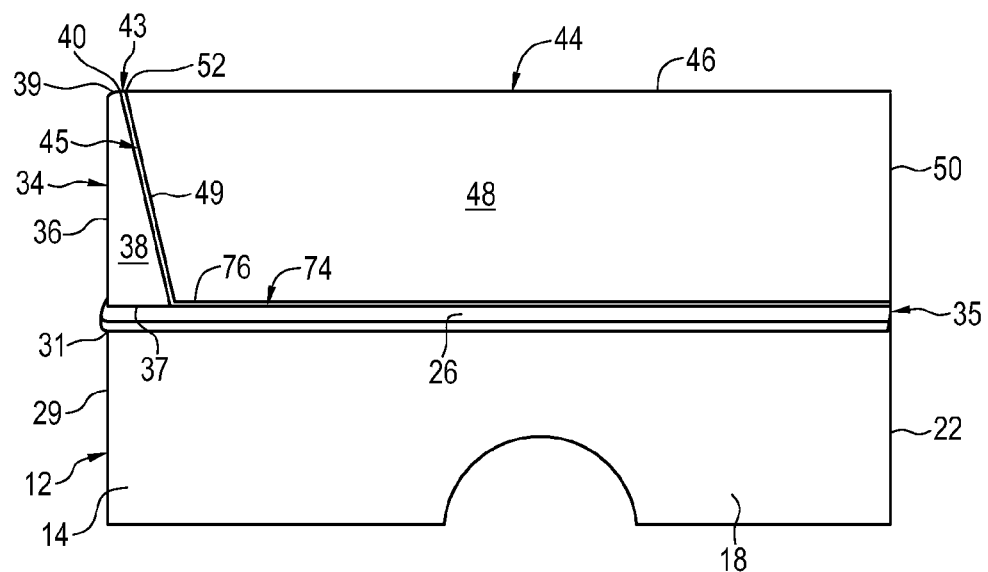
FIG. 3 is a side view of the box of the truck and the canopy system shown in FIG. 1 with the canopy shown in a closed position.

The canopy system 10 includes a canopy 44. The canopy is at least partially made of fiberglass in this example although it could be of aluminum or other materials. The canopy also in this example has a slightly tapered, rectangular shape as best shown in FIG. 7. Referring to FIGS. 1 and 7, the canopy 44 includes spaced-apart sides 48 and 53. Sides 48 and 53 of the canopy 44 are upwardly tapered towards each other, from the perspective of FIG. 7. Only side 48 of the canopy 44 will be described in detail with the understanding that side 53 is substantially the same in structure and function. Side 48 of the canopy 44 is alignable with and extendable substantially along all of side wall 18 of the box 14, as best shown in FIG. 3. Put another way, side 48 of the canopy 44 has a horizontal length from the perspective of FIG. 3 that is substantially the same as that of the side wall 18. In one preferred example the horizontal length of the side 48 is at least 85 percent of the horizontal length of the side wall 18. Referring to FIG. 7, side 53 of the canopy 44 is also alignable with and is extendable adjacent to substantially all of side wall 20 of the box 14. As best shown in FIG. 1, the canopy 44 has a lower peripheral edge 47 that is adjacent to the box when the canopy is in the closed position shown in FIG. 3.

The manner in which the canopy 44 and the frame 35 engage is shown in FIG. 10. An end view of channel 74 of the frame, and more particularly elongate portion 76, is shown in FIG. 10. The channel 74 is in this example shaped to snugly receive side 48 of the canopy 44 via the recess 92 of the channel 74. A seal 51, in this example having a circular cross-section, is disposed within the recess 92 and extends along the base 86 of the elongate portion 76. The seal is resilient, compressible and in this example is made of rubber. When the canopy 44 is lowered from the perspective of FIG. 10 to the closed position, the canopy 44 via its lower peripheral edge 47 engages the seal 51 which in turn abuts with the frame 35. The lower peripheral edge 47 may be referred to as an elongate projection portion of the canopy, in this example, that the channel is shaped to receive for sealably closing the canopy. The canopy 44 thus sealably engages with the frame 35. The seal 51 acts to inhibit water, debris and the like entering the channel 74 from passing through to the canopy 44 and into interior 17 of the box 14, shown in FIG. 1. The rest of the canopy 44 and frame 35 are sealably engageable with each other in a like manner.

Referring now to FIG. 11, side 48 of the canopy 44 has an end 49 configured to abut strut 38 of the canopy mount 34. The canopy mount 34 includes in this example a channel 45 as best shown in FIG. 11 extending from strut 38 towards the position of the canopy when lowered. Channel 45 extends from the lower end 37 of the strut 38 to the upper end 39 of the strut. Channel 45 is so disposed as to abut with and receive end 49 of the canopy 44. Another channel 61, as shown in FIG. 6, is similarly disposed so as to extend from strut 41 and engage the side 53 of the canopy 44 shown in FIG. 7. As shown in FIG. 6 channels 45 and 61 connect to and are in communication with channels 74 and 80, respectively. The channels 45 and 61 also include seals disposed therein, to further inhibit water, debris and other foreign objects from entering within the canopy 44 and interior 17 of box 14. Channels 45 and 61 are substantially similar in parts and function to channels 74 and 80 of the frame 35 and therefore will not be described in further detail.

As best shown in FIG. 7, the canopy 44 includes a rear portion 50 connected to and extending between the sides 48 and 53. The canopy 44 includes a window 55 in this example disposed along the rear portion 50. Rear portion 50 is alignable with and extendable above the tailgate 22.

Referring back to FIG. 1, the canopy 44 includes a top portion, in this example a roof 46 that connects to and extends between the sides 48 and 53 and rear portion 50. The sides 48 and 53, rear portion 50 and roof 46 enclose the generally rectangular-shaped interior 57 of the canopy 44.

The canopy 44 is pivotally connected to the canopy mount 34. In this example cross member 40 of the canopy mount 34 and roof 46 of the canopy 44 are hingedly connected together along edge 52 of the canopy 44 via one or more hinges 42. Some or all of these hinges may be connected together.

As best shown in FIG. 6, the canopy mount 34 includes a channel 43 extending from the cross member 40. Channel 43 extends from strut 38 to strut 41 and connects to both channels 45 and 61. The channel 43 is so disposed as to abut with and receive the roof 46 of the canopy 44 and more particularly end 52 of the canopy 44, shown in FIG. 1. Channel 43, which also includes a seal disposed therein, inhibits water, debris and other foreign objects from entering the interior 57 of the canopy 44 and interior 17 of box 14. Channel 43 is similar in parts and function to channels 74 and 80 of the frame 35 and therefore will not be described in further detail.

Referring now to FIG. 12, the canopy 44 may releasably connect to the frame 35 via a latching mechanism 96. The latching mechanism 96 in this example includes an electrically activated solenoid 98. The solenoid 98 is mounted to the frame 35 via a mount, in this example an L-shaped mount 100. The mount 100 has a protruding portion 101 extending upwards from the perspective of FIG. 12. Portion 101 has an aperture 99 extending therethrough. The latching mechanism 96 includes a pin 102 operatively connected to the solenoid 98 and which extends through aperture 99 of protruding portion 101. Pin 102 is configured so as to move from left to right (or right to left), from the perspective of FIG. 12, when the solenoid 98 is actuated. Solenoids per se as they relate to latching mechanisms are well known to those skilled in the art and therefore solenoid 98 will not be described in further detail.

A resilient member, in this example a spring 103, is coiled around the pin 102. The spring 103 is disposed between portion 101 of the mount 100 and end 105 of the pin 102. End 105 protrudes upwardly from the perspective of FIG. 12. The canopy 44 includes a flange 104 disposed within its interior 57. The flange 104 in this example connects to the rear portion 50 of the canopy 44. The flange 104 includes an aperture 106 extending therethrough that is shaped and positioned to receive the pin 102.

In operation, when the solenoid 98 is activated the pin 102 is caused to move to the right, from the perspective of FIG. 12, pass through aperture 106o the flange 104, and engage with flange 104 and thus the canopy 44. The pin 102 thus positioned is in a locked position. The pin 102 so positioned inhibits the canopy 44 from moving upwards, from the perspective of FIG. 12, and inadvertently moving into an open or partially open position. The canopy 44 may thus be latched to the frame 35. With the pin in the locked position, the spring 103 is disposed between and may abut both portion 101 of the mount 100 and flange 104. The spring 103 so disposed acts to absorb and minimize vibrations occurring along the mount 100, the flange 104 and/or the pin 102.

To unlatch the canopy 44, the solenoid 98 is electrically activated for latch disengagement so as to cause the pin 102 to move from right to left, from the perspective of FIG. 12, so as to disengage from the flange 104. The canopy 44 so unlatched from the latching mechanism 96 can be tilted upwards into an open position as shown in FIG. 1.

Referring back to FIG. 1, the canopy system 10 includes a pair of actuators 54 and 64. The actuators in the embodiment shown in FIGS. 1 to 13 are hydraulic actuators. As best shown in FIG. 2, actuator 54 includes a cylinder 56 pivotally connected at end 58 thereof to the actuator mount 26. The cylinder 56, at an end 59 opposite end 58, reciprocatingly engages and receives therewithin a rod 60. The rod 60 has an outer end 62 in this example which pivotally connects to the canopy 44 as shown in FIG. 1. Rod 60 connects to a region of the roof 46 of the canopy 44 that is adjacent to side 48 and is adjacent to and spaced-apart from edge 52 of the canopy in this example. Actuator 64 includes a cylinder 66 pivotally connected at end 68 to the actuator mount 28. The opposite end 69 of cylinder 66 reciprocatingly engages and receives therewithin a rod 70. The rod 70 has an outer end 72 in this example which pivotally connects to the canopy 44, shown in FIG. 1. Rod 70 connects to a region of the roof 46 of the canopy 44 that is adjacent to side 53 and adjacent to and spaced-apart from edge 52 of the canopy in this example. Hydraulic actuators per se are well known to those skilled in the art and therefore their various parts and features will not be further described.

Figure 13:
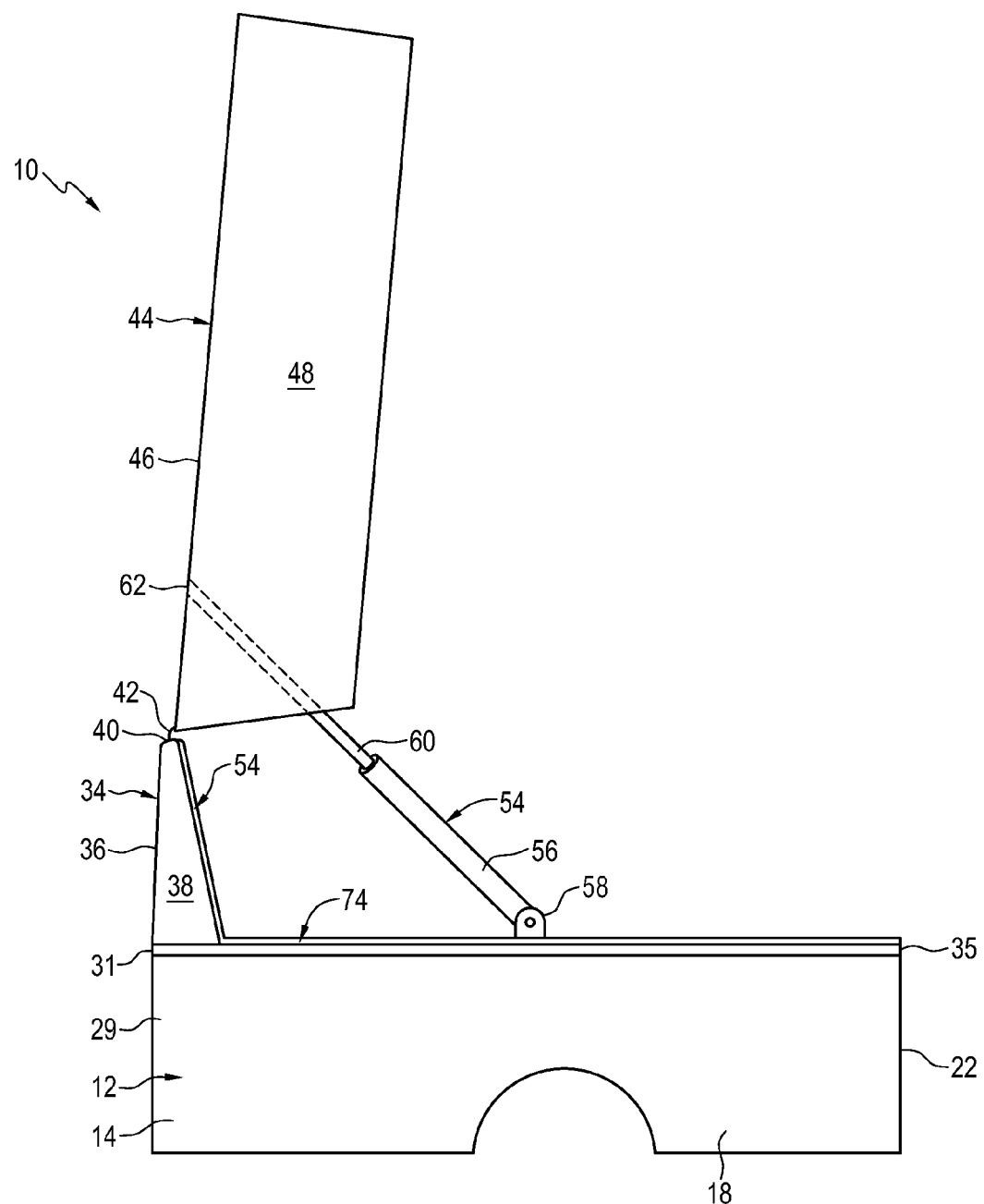
FIG. 13 is a side view of the truck box and the canopy system shown in FIG. 1 with the canopy shown in the fully open position.

In operation, pressurized fluid is selectively supplied to or withdrawn from the pair of hydraulics actuators 54 and 64 to cause the rods 60 and 70 to extend outwards from the cylinders 56 and 66, respectively, or retract within the cylinders 56 and 66, respectively when the fluid pressure is reduced. When the rods 60 and 70 are caused to retract within cylinders 56 and 66, respectively, the canopy 44 is lowered to a closed position, as shown in FIG. 3. The canopy 44 abuts the channels 74 and 80 of frame 35 and abuts the channels 45, 61 and 43 of canopy mount 34. When the rods 60 and 70 extend fully outwards and away from the cylinders 56 and 66, respectively, the canopy 44 is raised to a fully open position, as best shown in FIGS. 11 and 13. The fully open position of the canopy 44 facilitates the storage and removal of goods from the interior 57 of the canopy 44 and interior 17 of the box 12.

Many advantages result from the structure of the present invention compared to that of the known prior art. Referring to FIG. 1 the canopy system 10 is adapted to accommodate the existing box of a truck without altering or damaging the truck itself. Actuators 54 and 64 are disposed adjacent to the side walls 18 and 20 of the box 14 of the truck 12 to maximize the storage space within the canopy 44 and interior 17 of the box 14. The canopy 44, which extends along and covers substantially all of the box 14, is mounted in a way to maximize head space as shown in FIG. 13 when loading the truck 12. All of these factors combined represent an improvement over earlier raisable canopies.

Figure 14:
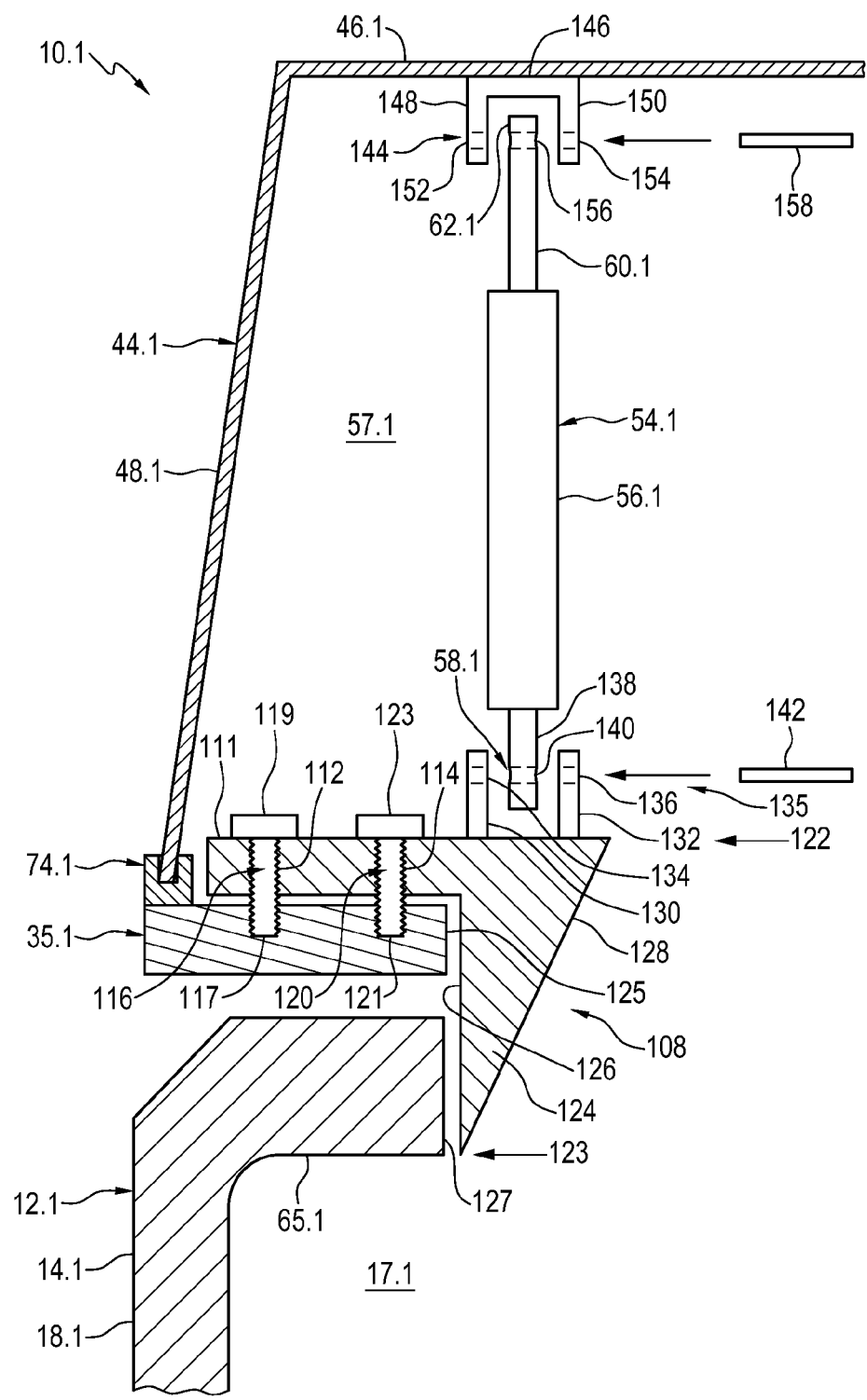
FIG. 14 is a sectional end view of an actuator mount according to another embodiment, the actuator mount being shown partially in cross-section, fragments of the canopy, frame and box of the truck also being shown in cross-section, and a hydraulic actuator being shown mounted to both the actuator mount and the canopy.

FIG. 14 shows a canopy system 10.1 and more particularly an actuator mount 108 according to another embodiment of the invention Like parts have like numbers and function with the addition of "0.1". The canopy system 10.1 shown in FIG. 14 is substantially similar to that shown in FIGS. 1 to 13 with the exception that there is further included actuator mount 108 with related components. This is in contrast to the embodiment of the canopy system shown in FIGS. 1 to 13, where the actuators were directly connected to the u-shaped frame 35 and where the actuator mounts 26 and 28 are parts of the u-shaped frame 35.

Referring to FIG. 14, actuator mount 108 includes a base portion, in this example a mounting plate 111. The mounting plate 111 is disposed within the interior 57.1 of the canopy 44.1. The mounting plate 111 abuts with, overlays and at least partially extends across the frame 35.1. In this example the mounting plate 111 is spaced-apart from the channel 74.1 to the right from the perspective of FIG. 14.

The mounting plate 111 in this example is connected to the frame 35.1 via a pair of spaced-apart mounting bolts 116 and 120. The mounting plate 111 includes a pair of spaced-apart apertures 112 and 114 shaped to receive the bolts 116 and 120, respectively. In this example the apertures 112 and 114 are threaded, though this is not required. The frame 35.1 includes a pair of spaced-apart threaded apertures 117 and 121 shaped and positioned to at least partially receive the bolts 116 and 120, respectively. The actuator mount 108 is thus connectable with the frame 35.1 via the bolts 116 and 120, respectively, that are threadably engageable with apertures 112 and 117 and 114 and 121. While two bolts 116 and 120 are shown, those skilled in the art will appreciate that only one bolt may be needed. Alternatively, more than two bolts may be used.

Actuator 54.1 is pivotally connected to the mounting plate 111 in this example via a pivotal connector 135. The pivotal connector 135 in this example includes a pair of spaced-apart projections 130 and 132 connected to and extending upwards from the mounting plate 111, from the perspective of FIG. 14. The pivotal connector 135 includes a pin 142. The projections 130 and 132 have apertures 134 and 136 shaped and positioned to receive the pin 142. Actuator 54.1 in this embodiment has an elongate member, in this example a shaft 138 extending from the cylinder 56.1 to end 58.1. The shaft 138 has an aperture 140 shaped and positioned to receive the pin 142. When the apertures 134 and 136 of the projections 130 and 132, respectively, and the aperture 140 of the shaft 138 are aligned, the pin 142 is insertable through apertures 136 and 140 and at least partially insertable through aperture 134 for pivotally connecting the mounting plate 111 to the actuator 56.1.

Actuator mount 108 may further include a cotter pin (not shown) for inserting through a transverse section of pin 142 to ensure that pin 142 remains in place and does not inadvertently slip out of engagement with the apertures 136, 140 and 134. Alternatively the pin 142 may be threadably connectable with for example aperture 134 and/or aperture 136 to ensure that the pin 142 remains in place.

Actuator mount 108 includes a flange portion, in this example a flange 124. Flange 124 is connected to and extends downwards from the mounting plate 111 from an upper end 122 of the mount 108, from the perspective of FIG. 14. Flange 124 is positioned adjacent to and below the projections 130 and 132, from the perspective of FIG. 14, in this example. Flange 124 in this example is triangular in cross-section, though this is not required, with an angled face 128 facing the interior 17.1 of the box 14.1. Face 128 extends from the upper end 122 at an acute angle relative to the upper end to a lower end 123 of the mount 108. Flange 124 also includes an elongate face 126 that extends perpendicular to and downwards from the upper end 122, from the perspective of FIG. 14, to the lower end 123. Face 126 is positioned to face and at least partially abut with the frame 35.1 and the box 14.1 of the truck 12.1, respectively. The frame 35.1 has an end 125 that faces the flange 124 as well as generally facing the interiors 17.1 and 57.1 of the box 14.1 and canopy 44.1, respectively. Flange 65.1 of the box has an end 127 that faces the flange 124 of the mount as well as generally facing the interiors 17.1 and 57.1 of the box 14.1 and canopy 44.1, respectively. Face 126 of flange 124 is thus abuttable with both end 125 of the frame 35.1 and end 127 of the flange 65.1 of the box 14.1. Flange 124 is so shaped and positioned as to add greater support and stability to the actuator mount 108, and specifically to the mounting plate 111 and projections 130 and 132.

The canopy system 10.1 also includes a pivotal connector 144 spaced-apart from pivotal connector 135. Pivotal connector 144 is disposed within the interior 57.1 of the canopy 44.1. Pivotal connector 144 in this example is in the shaped of a u-shaped bracket with a base 146 connected to the roof 46.1 of the canopy 44.1 via welding in this example. Pivotal connector 144 includes a pair of spaced-apart sides 148 and 150 connected to the base 146 and extending downwards and away from the roof 46.1 of the canopy 44.1 relative to FIG. 14. Pivotal connector 144 includes a pin 158. The sides 148 and 150 each have apertures 152 and 154, respectively, shaped and positioned to receive the pin 158.

Rod 60.1 of the actuator 54.1 has an aperture 156 adjacent to its outer end 62.1. The aperture 156 is shaped and positioned to receive the pin 158. When the apertures 152 and 154 of the sides 148 and 150, respectively, and the aperture 156 of the rod 60.1 are aligned, the pin 158 is insertable through apertures 154 and 156 and at least partially insertable through aperture 152 for pivotally connecting the actuator 56.1 to the canopy 44.1. A cotter pin (not shown) may further be included for inserting through an aperture in the pin 158 to ensure that the pin 158 remains in place and does not inadvertently slip out of engagement with the apertures 154, 156 and 152. Alternatively the pin 158 may be threadably connectable with aperture 152 and/or aperture 154 to ensure that the pin 158 remains in place.

Figure 15:
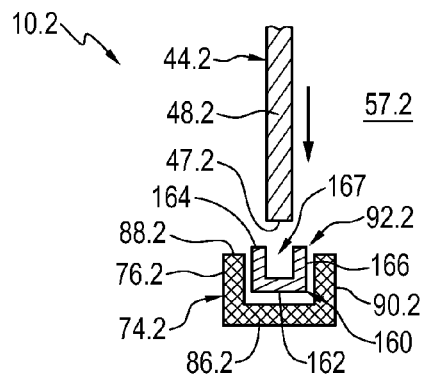
FIG. 15 is a cross-sectional end view of one of the channels of the canopy system's frame, a fragment of the canopy and a seal to another embodiment, the seal being u-shaped in cross-section.

FIG. 15 shows a canopy system 10.2 and more particularly a seal 160 according to a further embodiment Like parts have like numbers and function as the first embodiment above with the addition of "0.2". The canopy system 10.2 shown in FIG. 15 is substantially similar to that shown in FIGS. 1 to 13 with the exception of the seal 160. The manner in which the canopy 44.2 and the frame of the canopy system engage is substantially the same as that of FIG. 10 with the exception that in the canopy system 10.2 shown in FIG. 15 there is provided seal 160 having a u-shaped cross-section instead of the seal 51 with the circular cross-section of FIG. 10. The seal 160 has a base 162 shaped to fit within recess 92.2 and abut with base 86.2 of the elongate portion 76.2 of the channel 74.2. The seal 160 includes a pair of spaced-apart walls 164 and 166 extending upwards from the base 162, from the perspective of FIG. 15. Wall 164 of the seal 160 is shaped to fit within recess 92.2 and may abut with the wall 88.2 of the elongate portion 76.2 of the channel 74.2. Wall 166 of the seal 160 is shaped to fit within recess 92.2 and may abut with the wall 90.2 of the elongate portion 76.2 of the channel 74.2. The seal 160 has a generally rectangular-shaped recess 167 in this example. The recess 167 is located between the base 162 and walls 164 and 166. The seal 160 is shaped to snugly receive side 48.2 of the canopy 44.2 via recess 167.

When the canopy 44.2 is lowered, from the perspective of FIG. 15, to the closed position, the canopy 44.2 engages with the seal 160 which in turn abuts with the channel 74.2 and hence the frame of the canopy system. The seal 160 may be at least partially compressed by the canopy 44.2 thereby, with wall 164 of the seal abutting wall 88.2 and wall 166 of the seal 160 abutting wall 90.2. The canopy 44.2 thus sealably engages with the frame of the canopy system. The seal 160 may act to inhibit water, debris and the like entering the channel 74.2 from passing through to the interior 57.2 of the canopy 44.2 and the interior of the box. The rest of the canopy 44.2 and frame may be sealably engageable with each other in a like manner.

Figure 16:
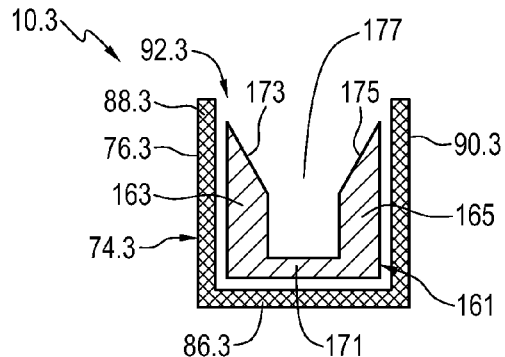
FIG. 16 is a cross-sectional end view of one of the channels of the canopy system's frame and a seal according to a further embodiment, the seal being u-shaped and tapered in cross-section.

FIG. 16 shows a canopy system 10.3 and more particularly a seal 161 according to a yet further embodiment Like parts have like numbers and function with the addition of "0.3". The canopy system 10.3 shown in FIG. 16 is substantially similar to that shown in FIGS. 1 to 13 with the exception of the seal 161. Seal 161 is u-shaped in cross-section with spaced-apart walls 163 and 165 and a base 171 extending therebetween. Seal 161 is shaped to fit within recess 92.3 of the channel 74.3 and is substantially similar in parts and function to seal 160 shown in FIG. 15 with one exception being that walls 163 and 165 have inwardly tapered ends 173 and 175 that face interior 177 of the seal 161. Tapered ends 173 and 175 act as centering guides to promote proper alignment of the canopy with the seal 161 and channel 74.3. Put another way, seal 161 thus shaped acts as a tapered guide to facilitate alignment of the channels with the canopy.

Figure 17:
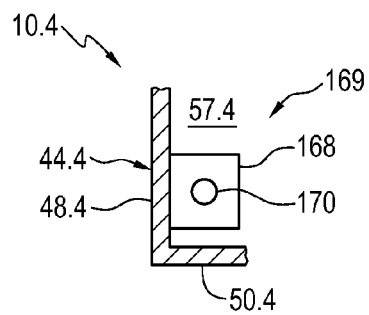
FIG. 17 is a fragmentary, top plan view of a canopy in section according to another embodiment of the canopy system, showing a flange for a latching mechanism extending outwards therefrom.
Figure 18:
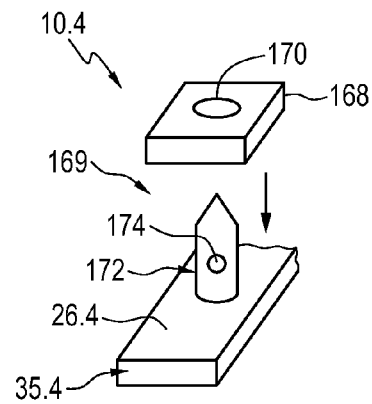
FIG. 18 is a top perspective view of the latch mechanism referred to in FIG. 17, showing a fragment of the canopy system's frame, the frame including a pin extending outwards therefrom, and the flange of the canopy referred to in FIG. 17.
Figure 19:
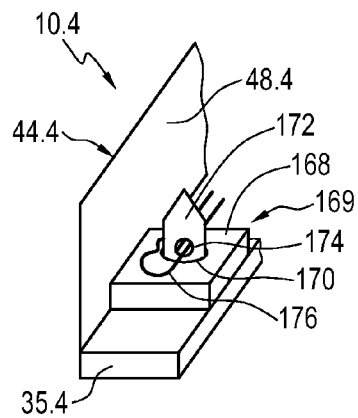
FIG. 19 is a top perspective view of the latch mechanism according to the embodiment shown in FIGS. 17 and 18, showing fragments of the canopy system's frame and canopy, and showing the pin and flange in the process of engaging together.

FIGS. 17 to 19 show a canopy system 10.4 and more particularly a latching mechanism 169 according to an even further embodiment Like parts have like numbers and function with the addition of "0.4". The canopy system 10.4 shown in FIGS. 17 to 19 is substantially similar to that shown in FIGS. 1 to 13 with the exception of the latching mechanism 169 and related parts replacing latching mechanism 96 shown in FIG. 12. FIG. 17 is a cross-sectional top view of the canopy 44.4 shown in fragment. The latching mechanism 169 includes a flange 168 connected to the canopy 44.4. In this example the flange 168 is perpendicular to side 48.4 of the canopy 44.4 and extends away from side 48.4 towards the interior 57.4 of the canopy. Also flange 168 is positioned adjacent and perpendicular to rear portion 50.4 of the canopy 44.4 in this example. Flange 168 includes an aperture 170 extending therethrough. Referring to FIG. 18, the latching mechanism 169 includes an elongate member in this example a pin 172. Pin 172 is connected to and extends away from the frame 35.4. In this example the pin 172 extends perpendicular to and upwards from the frame 35.4, from the perspective of FIG. 18. The pin 172 includes an aperture 174 extending, in this example, transversely therethrough. Pin 172 and flange 168 are so positioned as to be alignable with each other, with the pin 172 being alignable with the aperture 170. The aperture 170 of the flange 168 is shaped and positioned to receive the pin 172.

Referring to FIG. 19, when the canopy 44.4 is lowered towards the closed position, pin 172 passes through the aperture 170 of the flange 168. In the fully closed position the flange 168 may thus abut with the frame 35.4. The latching mechanism 169 includes a cotter pin 176 that is insertable through aperture 174 of the pin 172 upon the canopy 44.4 being in the closed position. The cotter pin 176 is positioned to be abuttable with the flange 170. With pin 172, flange 168 and cotter pin 176 so engaged, the canopy 44.4 is inhibited from moving to upward, from the perspective of FIG. 19, and inhibited from inadvertently moving into an open or partially open position. The canopy 44.4 may thus be latched to the frame 35.4 and hence the canopy system 10.4.

To unlatch the canopy 44.4 the cotter pin 176 is removed from pin 172. This thereby enables the canopy 44.4 to move upwards, from the perspective of FIG. 19, with the flange 168 disengaging with the pin 172 and extending upwards and away therefrom. The canopy 44.4 so unlatched may now move upwards into an open position.

Figure 20:
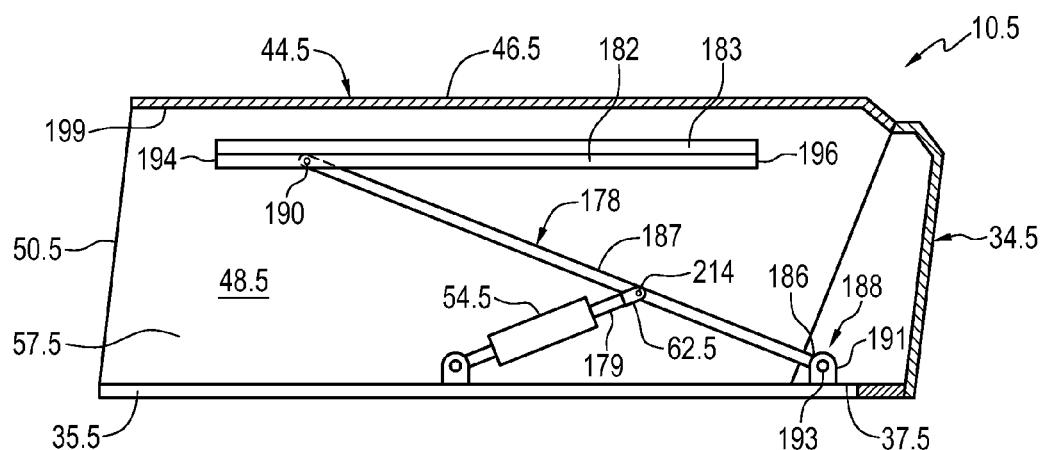
FIG. 20 is an elevation view of a canopy system partially in cross-section according to a further embodiment, showing the canopy, the canopy mount, one of a pair of actuators, one of a pair of lift bars, one of a pair of guide rails and one of a pair of mounts therefor.
Figure 21:
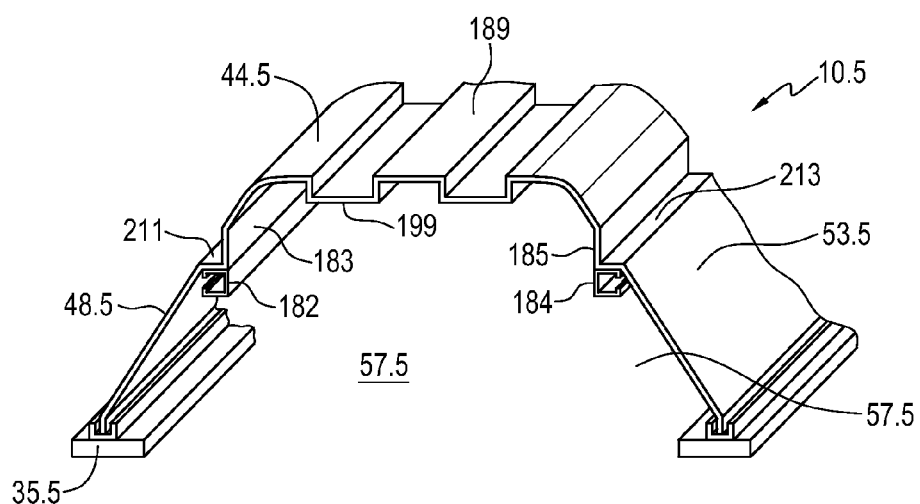
FIG. 21 is a top, fragmentary perspective view of the canopy system shown in FIG. 20, showing the pair of guide rails and the mounts therefor, with the corresponding actuators, the corresponding lift bars and the rear portion of the canopy not being shown.
Figure 23:
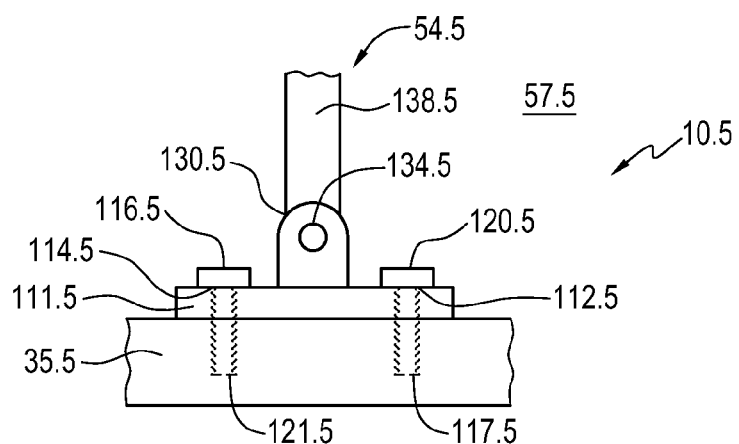
FIG. 23 is an elevation view of the actuator mount shown in FIG. 22, with fragments of the frame and corresponding actuator also being shown and the canopy removed.
Figure 24:
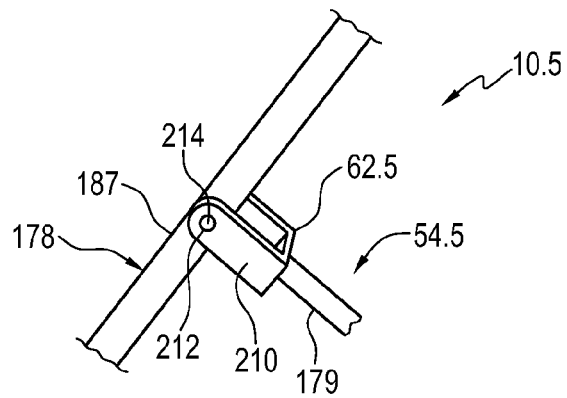
FIG. 24 is an elevation fragmentary view of one of the lift bars of FIG. 20 and one of the actuators of FIG. 20, with the manner in which actuators connect to the lift bars being shown in more detail.
Figure 25:
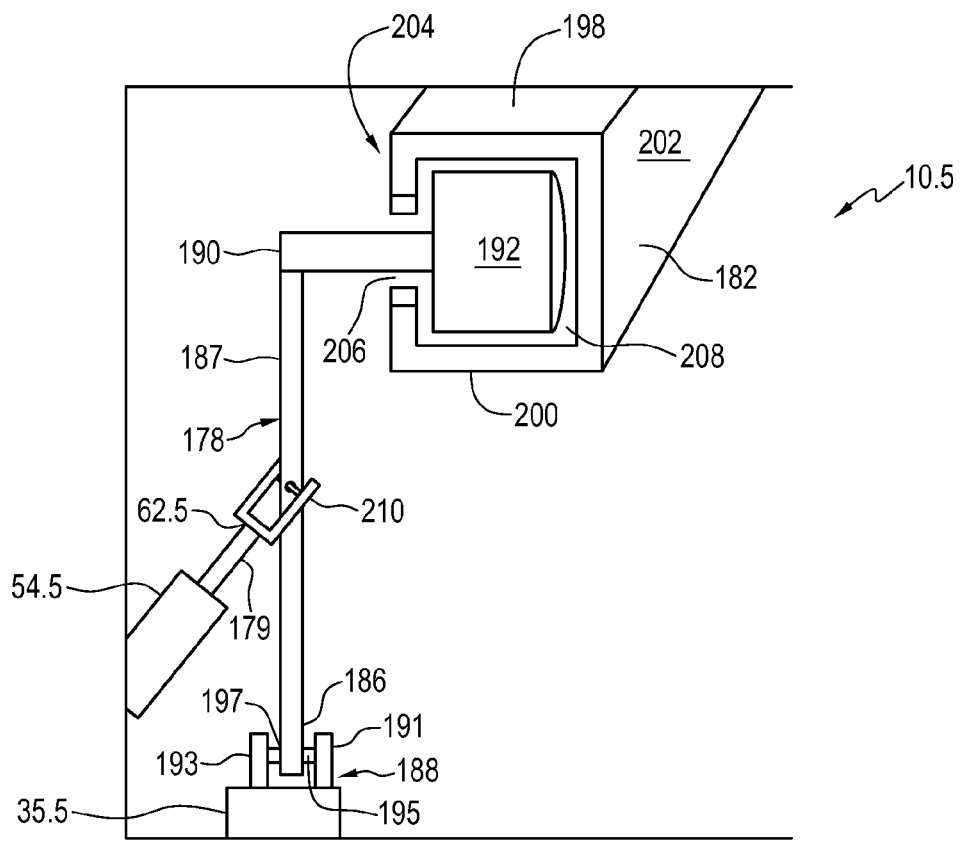
FIG. 25 is a top, rear perspective view of the canopy system shown in FIG. 20, showing the manner in which the lift bars are connected to both the canopy frame and the guide rails, the cross-sectional shape of the guide rail and a fragment of the actuator connected to the lift bar.

FIGS. 20 to 25 show a canopy system 10.5 and more particularly, a canopy 44.5, actuators 54.5, lift bars 178 and guide rails 182 and 184 according to an additional embodiment. For FIGS. 20, 21, 24 and 25, canopy system 10.5 is similar to that shown in FIGS. 1 to 13 with like parts having like numbers and functions with the addition of "0.5". As mentioned above, in this embodiment canopy system 10.5 includes a pair of corresponding guide rails 182 and 184 as best shown in FIGS. 21 and 25 and a pair of lift bars, of which only one lift bar 178 is shown in FIG. 20.

Referring first to the lift bars of the canopy system 10.5 and FIG. 20, only lift bar 178 will be described with the understanding that the other lift bar is substantially the same in part and function. Lift bar 178 has a first end 186 disposed towards and in this example adjacent to the lower end 37.5 of the canopy mount 34.5. The first end 186 of the lift bar is pivotally mounted to the frame 35.5 in this example via a pivot 188. As best shown in FIG. 25, pivot 188 in this example includes a pair of spaced-apart projections 191 and 193 and a pin 195 extendable therebetween. The pin 195 is rotatable and extends through an aperture 197 in the lift bar 178 near end 186. The lift bar 178 includes an elongate portion 187 that extends from the first end 186 to a second end 190 of the lift bar opposite the first end 186. Second end 190 of the lift bar includes a protrusion in this example including a rotatable roller 192 shaped to be received within guide rail 182.

Referring to FIG. 21, the canopy 44.5 has a pair of L-shaped portions 183 and 185 which are a part of and integrally moulded with the canopy. Portions 183 and 185 extend along parallel to sides 48.5 and 53.5, respectively, and include horizontal flat portions 211 and 213. Portions 183 and 185 of the canopy are disposed adjacent to ceiling 199 and roof 46.5 of the canopy 44.5. Roof 46.5 is corrugated in this example as indicated by numeral 189 to increase the canopy's strength.

The guide rails 182 and 184 are mounted canopy 44.5 and are disposed within interior 57.5. Guide rail 182 is mounted to and extends along side 48.5 by connecting to horizontal flat portion 211 and guide rail 184 is mounted to and extends along side 53.5 by connecting to horizontal flat portion 213. The guide rails extend generally parallel to ceiling 199 of the canopy 44.5 as shown in FIG. 20 for guide rail 182. Each of the guide rails as shown by guide rail 182 has a first end 194 adjacent to the rear portion 50.5 of the canopy 44.5. Each guide rail as shown by guide rail 182 extends from its first end 194 towards the canopy mount 34.5 to a second end 196 opposite the first end 194.

As best shown in FIG. 25, the guide rails, as shown by guide rail 182, are generally in the shape of square tubes in this example and shaped as guide tracks. In particular, guide rail 182 is generally c-shape in cross-section, with a top 198, bottom 200, closed side 202 extending between the top 198 and bottom 200, and open side 204 with a slot 206 opposite the closed side. The slot 206 extends along the length of the guide rail, that is in communication with an interior 208 of the rail and is shaped to receive roller 192. Roller 192 of the lift bar 178 is partially disposable through slot 206. Roller 192 and hence the lift bar 182 are thus moveably engageable with the guide rail 182 via slot 206. Put another way, the roller 192 is shaped for rolling inside the guide rail 182. This allows the lift bar 182 to travel along the guide rail 182 with minimal friction or play. A similar lift bar and roller are on the opposite side of the canopy for guide rail 184 shown in FIG. 21.

Referring to FIG. 20, actuators 54.5 in this preferred embodiment are linear actuators, in this example conventional 12-volt linear actuators. The linear actuators may have their own power supply and/or may be configured to connect to the truck's battery. The actuators, of which only one actuator 54.5 is shown, pivotally connect, in this example via outer ends 62.5 of shafts 179, to the lift bars 178. As best shown in FIG. 24, canopy system 10.5 includes a u-shaped bracket in this example a clevis 210 connected to actuator 54.5 at end 62.5. The clevis 210 is shaped to receive the lift bar 178. Lift bar 178 includes an aperture 214 extending therethrough. As seen in FIG. 20, aperture 214 is spaced-apart from first end 186 of the lift bar. Referring back to FIG. 24, clevis 210 pivotally connects to the lift bar 178 via a pin 212 that extends across the opening of the clevis and through aperture 214 of the lift bar. Shaft 179 may be selectively extended or retracted by linear actuator 54.5, as is well known to those skilled in the art. The other of the actuators connects to and operates in conjunction with the other of the lift bars in a substantially like manner.

Figure 22:
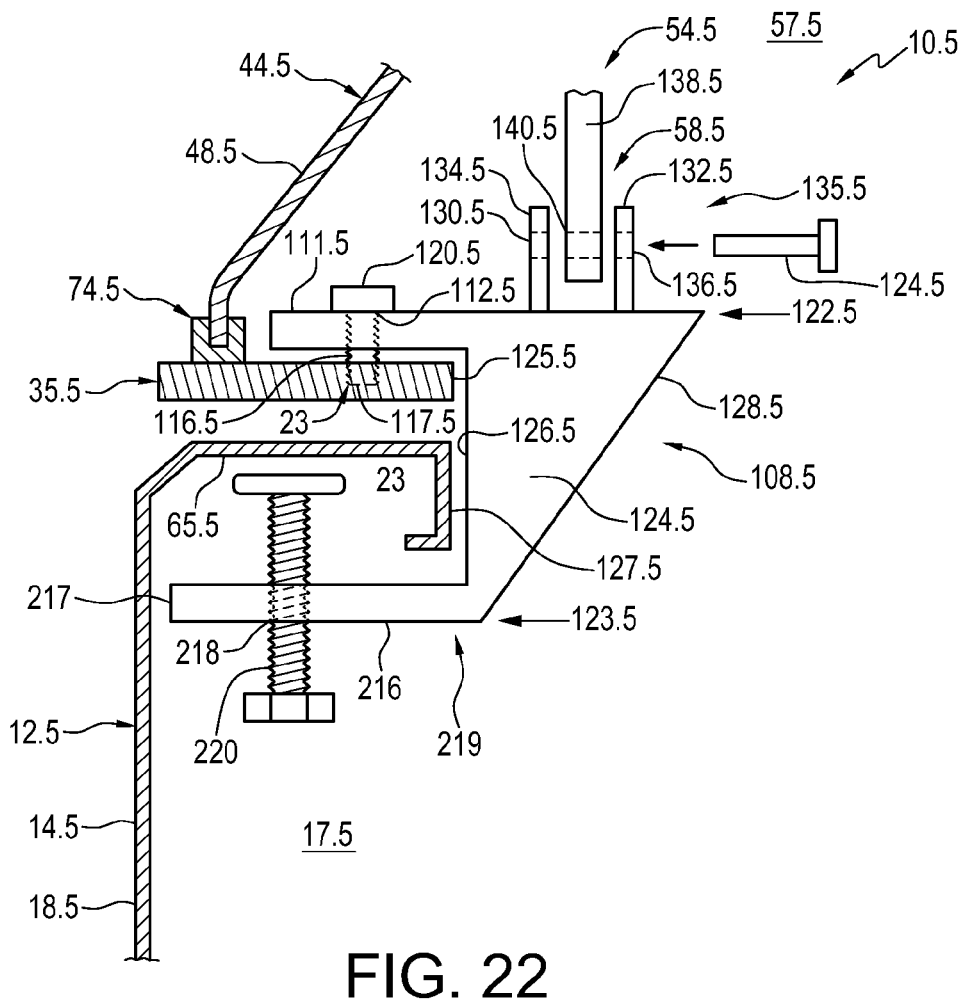
FIG. 22 is an end view of one of a pair of actuator mounts for the embodiment of the canopy shown in FIG. 20, fragments of the canopy and box of the truck shown in cross-section, the frame of the canopy system shown in cross-section, and a fragment of an actuator connected the actuator mount.

FIGS. 22 and 23 show an actuator mount 108.5 of the canopy system 10.5 according to a further additional embodiment. Actuator mount 108.5 is similar to actuator mount 108 shown in FIG. 14 except actuator mount 108.5 includes within it a clamping mechanism or clamp portion 219, which may reduce the number of required clamps 63 shown in FIG. 4. Like parts have like numbers and function as those shown in FIG. 14 with the addition of "0.5".

Actuator mount 108.5 includes a projection member, in this example plate 216 that extends from face 126.5 of flange 124.5 at a point adjacent to a position where face 126.5 and face 128.5 are adjacent to each other. Plate 216 extends generally parallel to flange 65.5 of the box 14.5. The plate also extends from flange 124.5 towards side wall 18.5 of the box 14.5. Plate 216 has an end 217 spaced-apart from wall 18.5 in this example. The plate includes a threaded aperture 218 through which an adjustable screw 220 is threadably connected. The adjustable screw 220 at least partially faces flange 65.5. Clamp portion 219 is c-shaped in cross-section and includes part of plate 111.5, flange 124.5, plate 216 and adjustable screw 220. The clamp portion 219 is integral with the rest of the actuator mount 108.5. Adjustable screw 220 may be rotated to frictionally engage flange 65.5, which in turn causes plate 111.5 to frictionally engage frame 35.5 of the canopy system 10.5. The canopy system 10.5 and the box 14.5 are thereby connectable together.

As best shown in FIG. 23, the actuator mount 108.5 and canopy system 10.5 have bolts 116.5 and 120.5, apertures 112.5 and 114.5 in plate 111.5, and apertures 117.5 and 121.5 in frame 35 that all align in parallel with side wall 18.5 of the box 14.5. This allows plate 111.5 to be relatively narrow compared with plate 111 of FIG. 14. This in contrast to the bolts and apertures shown in FIG. 14 which are aligned generally perpendicular to side wall 18.1.

The structure of the canopy system 10.5 as herein described provides many advantages. The use of lift bars 178 and guide rails 182 and 184 reduces the required stroke of the actuators 54.5. As a result, a relatively smaller actuator may be used and this reduces the overall cost of the system. Thus, the canopy system 10.5, with its linear actuators 54.5, lift bars 178 and guide rails 182 and 184, may be selectively raised and lowered in a more cost-effective manner.

Canopy system 10.5 provides a greater storage space within its interior 57.5 by disposing the guide rails 182 and 184 along both sides 48.5 and 53.5 of the canopy near ceiling 199. In one preferred embodiment, the guide rails are so configured as to ensure that moving parts, including the actuators and lift bars, are kept to the outside of the inner edges of the wheel wells as shown as numerals 81 and 83 of FIG. 2.

Actuator mount 108.5 provides yet further advantages and space savings, being configured to both provide a stable base for the pin and clevis assemblies of the actuators and enabling the canopy system to be clamped to the truck, with bolts 116.5 and 120.5 arranged to align parallel to side wall 18.5, enabling plate 111.5 and thus actuator mount 108.5 to be even more compact. Put another way, actuator mount 108.5 as herein described provides further space savings for interior 57.5 of the canopy while continuing to connect the actuators 54.5 to the frame 35.5 of the canopy system in a robust manner and while at the same time being further configured to clamp the canopy system to the truck.

Figure 26:
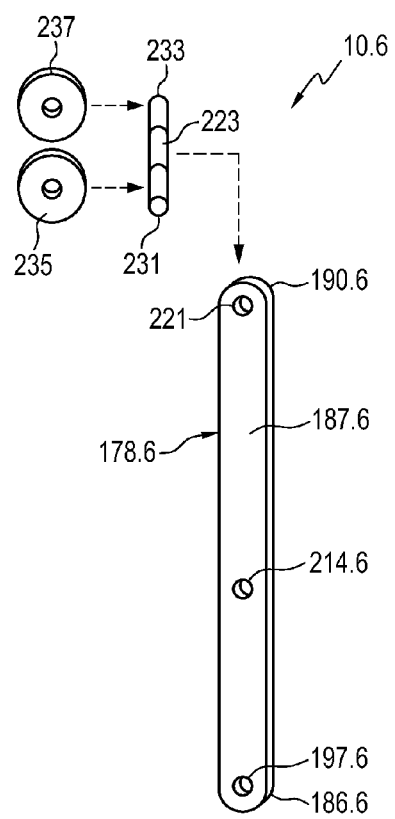
FIG. 26 is a side perspective view of a lift bar for a canopy system according to a yet further embodiment.
Figure 27:
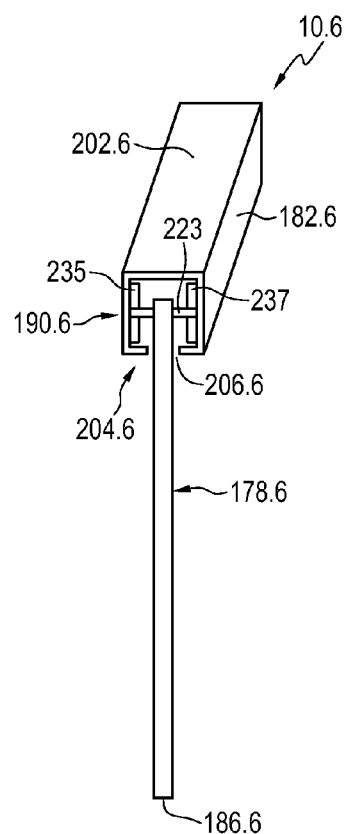
FIG. 27 is an end elevation view of the lift bar shown in FIG. 26 together with a downward facing guide rail.

FIGS. 26 and 27 show a canopy system 10.6 according to yet another embodiment. The canopy system 10.6 shown in FIGS. 26 and 27 is substantially similar to that shown in FIGS. 20 to 25, with like parts having like numbers and function with the addition of "0.6" and "0.6" being added to numerals not previously having a decimal extension, with the following exceptions. Open ends 204.6 of the guide rails 182.6 face downwards, from the perspective of FIG. 27. Referring to FIG. 26, each of the lift bars 178.6 has an aperture 221 adjacent to its end 190.6 and through which extend rods 223. Each of the rods has a pair of spaced-apart ends 231 and 233 upon which are connected a pair of rollers 235 and 237. The rollers are shaped to slidably engage with rail 182.6 as shown in FIG. 27. The position of guide rails and the pairs of rollers act to further stabilize the canopy system 10.6.

Figure 28:
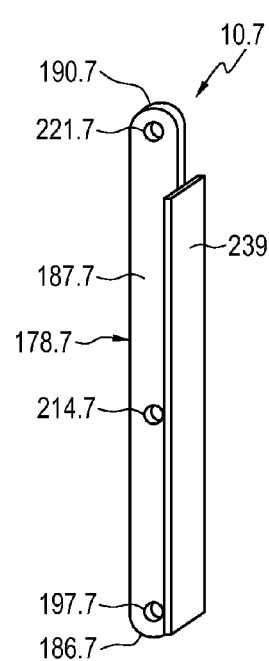
FIG. 28 is a side perspective view of a lift bar for a canopy system according to yet another embodiment.

Yet a further variation to system 10.6 is shown in FIG. 28 with canopy system 10.7. Canopy system 10.7 shown in FIG. 28 is substantially similar to that shown in FIGS. 26 and 27, with like parts having like numbers and function with the addition of "0.7" and "0.7" being added to numerals not previously having a decimal extension, with the following exceptions. In this case lift bar 178.7 includes a reinforcement strip 239 that connects perpendicular to its elongate member 187.7 in this example via welding. The strip extends from end 186.7 towards and adjacent to end 190.7. Thus, lift bar 178.7 is t-shaped in cross-section. Strip 239 acts to yet further reinforce system 10.7, though it is not strictly required.

Figure 29:
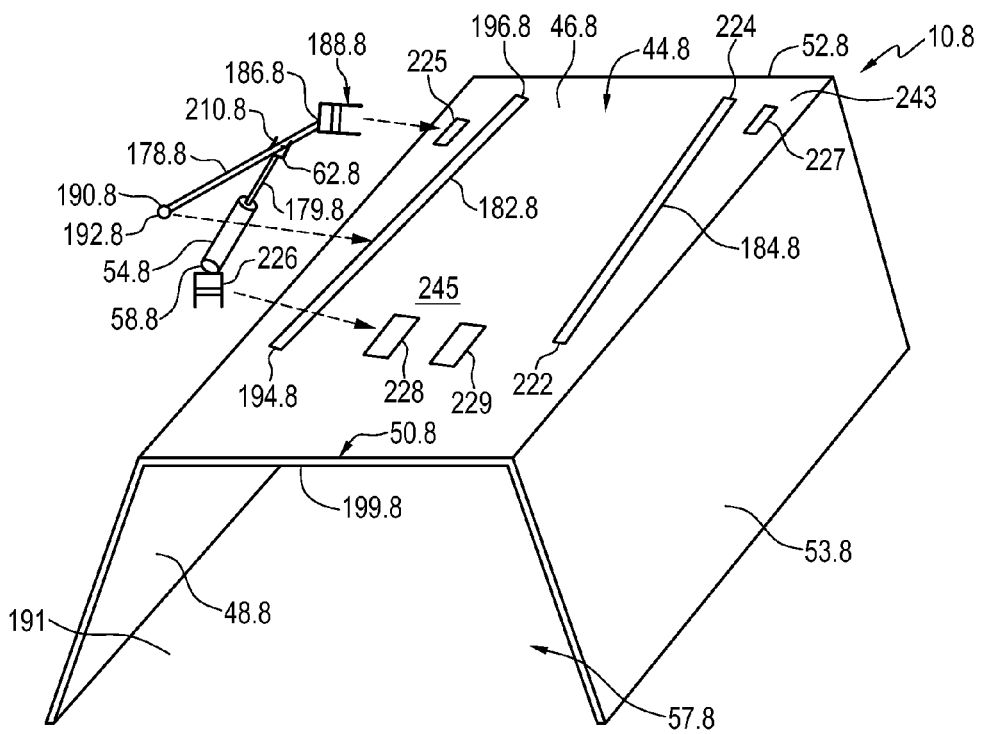
FIG. 29 is a top, rear perspective view of a canopy, one of a pair of actuators, one of a pair of lift bars, a pair of guide rails and mounts therefor according to an even further embodiment of the canopy system, the actuator and the lift bar being spaced-apart from their corresponding guide rail.

FIG. 29 shows a canopy system 10.8 and more particularly, a canopy 44.8, actuators 54.8, lift bars 178.8 and guide rails 182.8 and 184.8 according to an even further embodiment. Canopy system 10.8 is similar to that shown in FIGS. 20, 21 and 23 to 25, with like parts having like numbers and function with "0.8" replacing "0.5" and "0.8" being added for parts not previously having decimal extensions.

Guide rails 182.8 and 184.8 in this embodiment are mounted to the ceiling 199.8 or roof 46.8 of the canopy within interior 57.8. Guide rails 182.8 and 184.8 include first ends 194.8 and 222 disposed adjacent to sides 48.8 and 53.8, respectively and adjacent to rear portion 50.8. The guide rails extend from their first ends to second ends 196.8 and 224 which are disposed adjacent to edge 52.8 of the canopy. Guide rails 182.8 and 184.8 are disposed on the ceiling 199.8 in an inwardly tapered manner such that the guide rails at their second ends 196.8 and 224 are spaced-apart further from sides 48.8 and 53.8 compared to the distance of separation between first ends 194.8 and 222 and sides 48.8 and 53.8, respectively.

Lift bar 178.8 has a first end 186.8 pivotally mounted to the ceiling 199.8 at a point adjacent to side 48.8 via a clevis 188.8 with a pin (not shown) being extendable through the clevis 188.8. The clevis in turn connects to mount 225 on ceiling 199.8 in this example via welding. Mount 225 is disposed between guide rail 182.8 and side 48.8 and in this example is adjacent to end 196.8 of the guide rail. Second end 190.8 of the lift bar 178.8 includes a roller 192.8 shaped to move within guide rail 182.8. Canopy system 10.8 includes another lift bar (not shown) for guide rail 184.8 and which has substantially similar parts and connects in a substantially similar manner via mount 227 to ceiling 199.8. Mount 227 is disposed between guide rail 184.8 and side 53.8 of the canopy and is adjacent to end 224 of the guide rail 184.8. Mounts 225 and 227 are adjacent to the peripheral portion of the roof of the canopy as indicated by numeral 243.

Actuator 54.8 includes a u-shaped bracket, in this example clevis 210.8 at end 62.8 shaped to receive the lift bar 178.8, with a pin (not shown) being extendable through the clevis such that clevis 210.8 is configured to pivotally connect to the lift bar 178.8 in a manner substantially similar to that shown in FIG. 24. Actuator 54.8 has a further u-shaped bracket at end 58.8, in this example clevis 226 configured to pivotally connect to a mount 228 on ceiling 199.8 also in a manner similar to the connection shown in FIG. 24. Mount 228 is disposed near the center of the ceiling 199.8 or roof 46.8 between guide rails 182.8 and 184.8 and adjacent to ends 194.8 and 222 of the guide rails. Canopy system 10.8 includes another actuator (not shown) for the other lift bar (not shown) and guide rail 184.8 and which has substantially similar parts and connects in a substantially similar manner via mount 229 to ceiling 199.8. Mount 229 is disposed generally between guide rails 184.8 and 194.8, adjacent to ends 194.8 and 222 of the guide rails and spaced-apart from mount 228. Mounts 228 and 229 are interposed between sides 48.6 and 53.8 of the canopy and disposed adjacent to central portion 245 of the roof.

Actuators 54.8 are selectively extendable which causes the lift bars 178.8 to engage with and move along guide rails 182.8 and 184.8. The lift bars 178.8 are thus caused to rise, relative to FIG. 29, with ends 192.8 of the lift bars moving towards ends 196.8 and 224 of the guide rails 182.8 and 184.8. This in turn causes the canopy 44 to rise.

Canopy system 10.8 as herein described provides a further storage space advantage, with its actuators 54.8 and lift bars 178.8 being mounted to the ceiling 199.8, by keeping moving parts to one side, by the ceiling of the canopy, and thus freeing up space and additional clearance at the base 191 of interior 57.8. Here too in one preferred embodiment the guide rails, lift bars and actuators are so configured and mounted as to ensure that moving parts, including the actuators and lift bars, are kept to the outside of the inner edges, shown as numerals 81 and 83 of FIG. 2, of the wheel wells.

Figure 30:
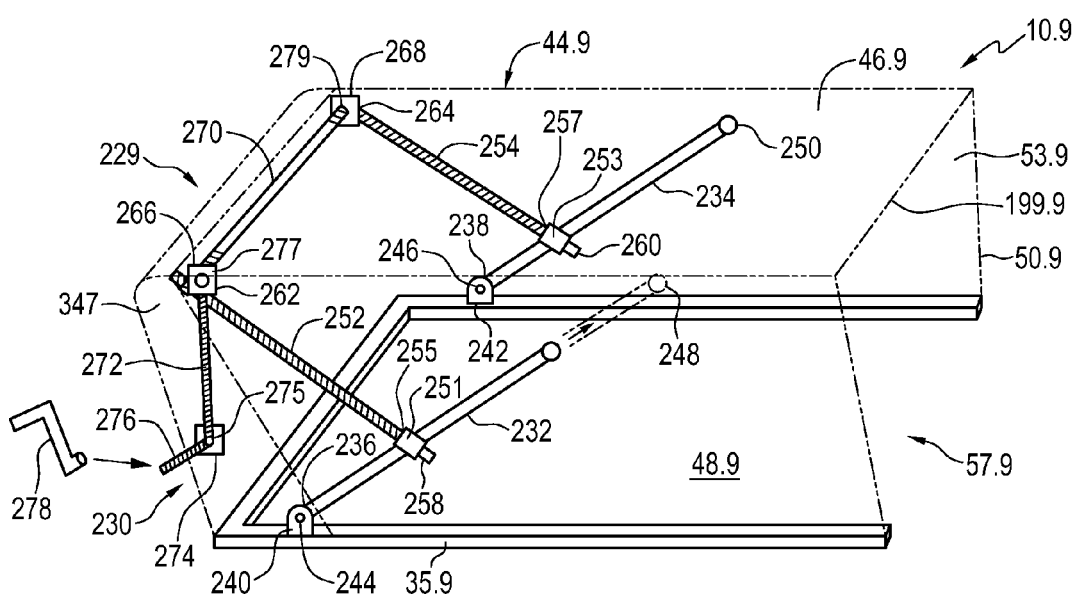
FIG. 30 is a top, side perspective view of a canopy and a hand crank system according to an additional embodiment of the canopy system, with the canopy and canopy mount being shown in ghost to reveal the interior of the canopy.

FIGS. 30 to 32 show a canopy system 10.9 according to yet another embodiment. The canopy system 10.9 shown in FIGS. 30 to 32 is substantially similar to that shown in FIGS. 1 to 13, with like parts having like numbers and function with the addition of "0.9", and with the exception that canopy system 10.9 includes a hand crank system 229 as a form of actuator instead of actuators 54.

The hand crank system 229 includes a pair of spaced-apart lift bars 232 and 234. The lift bars 232 and 234 are pivotally mounted to frame 35.9 at first ends 236 and 238 via a pair of u-shaped brackets 240 and 242 with pins 244 and 246 extending therethrough and extending through corresponding apertures in the lift bars. The lift bars extend from their first ends to second ends 248 and 250. Second ends 248 and 250 may include rollers and the system 10.9 may further include guide rails such as those shown in FIGS. 26 and 27 that the rollers engage. Alternatively, ends 248 and 250 may slidably abut ceiling 199.9 of the canopy as the canopy 44.9 is selectively raised or lowered.

The hand crank system 229 includes a pair of sleeves 251 and 253 mounted to one side of the lift bars 232 and 234, respectively. Sleeve 251 is positioned between first end 236 and second end 248 and sleeve 253 is positioned between first end 238 and second end 250. The sleeves have threaded apertures 255 and 257.

The hand crank system 229 also includes a pair of spaced-apart threaded members, in this example threaded rods 252 and 254 shaped and positioned to threadably engage with and extend through the threaded apertures 255 and 257 of the sleeves 248 and 250 adjacent to first ends 258 and 260 of the rods 252 and 254, respectively. The rods extend to second ends 262 and 264 which are rotatably received within mounts 266 and 268. Mounts 266 and 268 connect to ceiling 199.9 within the interior 57.9 of the canopy. Mounts 266 and 268 are disposed adjacent to sides 48.9 and 53.9 of the canopy and adjacent to canopy mount 34.9.

The hand crank system 229 in this example includes a rod 270 with threaded ends, disposed adjacent to ceiling 199.9 and canopy mount 34.9. Rod 270 extends between and couples together with mounts 266 and 268. Rod 270 is configured to be threadably, operatively engageable with the rods 252 and 254. Rod 270 is mounted to the ceiling 199.9 of the canopy with suitable brackets and bearings.

A further threaded member in this example threaded rod 272 extends down from mount 266 to an end 275 of the rod 272 which is adjacent to an aperture 274 in the canopy mount 34.9. Rod 272 is configured to threadably engage with rod 252 and rod 270. A rotating shaft 276 threadably engages with rod 272 at end 275 of the rod 272 and extends outwards from the aperture 274, away from side 48.9 of the canopy. The system 229 in this example further includes a removable hand crank 278 configured to fit with shaft 276 and transmit rotary movement to the rod 272.

Referring to FIG. 31, shaft 276 and rod 272 threadably engage with each other via a worm gear mechanism comprising a worm 280 and worm gear 282. Worm gear mechanisms per se are well known to those skilled in the art and therefore will not be described in detail. System 229 also includes a worm gear mechanism 277 within mount 266 such that rotary movement of rod 272 is transmitted to rod 252 and rod 270. In particular, rod 272 has a further worm gear, similar to that shown in FIG. 31, adjacent to the ends of rods 252 and 270 and rods 252 and 270 have worms, similar to that shown in FIG. 31, configured to engage the further worm gear of rod 272 in a like manner as that shown in FIG. 31. As shown in FIGS. 31 and 32, an angled drive gear mechanism 279 is provided within mount 268 such that rotary movement of rod 270 via its angled gear 271 is transmitted to rod 254 via its angled gear 273.

In operation, as hand crank 278 is rotated, rods 272, 252, 270 and 254 are caused to rotate, with the effect being that rods 252 and 254 are selectively engageable with sleeves 251 and 253 and thus engageable with lift bars 232 and 234 for selectively lowering and raising canopy 44.9 as desired. Ends 248 and 250 of the lift bars 232 and 234 will move to the left from the perspective of FIG. 30, towards canopy mount 34.9 and within guide rails (not shown) or along the ceiling 199.9, as the canopy 44.9 is raised.

FIG. 33 shows a canopy system 10.10 according to yet a further embodiment. The canopy system 10.10 shown in FIG. 33 is substantially similar to that shown in FIGS. 30 to 32, with like parts having like numbers and function with the addition of "0.10" and the addition of "0.10" for parts not previously having decimal extensions, with the following exceptions. Canopy system 10.10 has a first sprocket or pulley 284 rotatably mounted to the canopy with a socket 286 for receiving crank 278.10 and a second sprocket or pulley 288 rotatably mounted to the canopy and operatively connected to rod 270.10. A chain or belt 290 is operatively connected to pulleys 284 and 288. Rods 270.10 and 252.10 are operatively connected together via an angled drive gear mechanism 281 similar to that shown in FIG. 32, as are rods 270.10 and 254.10 via angled drive gear mechanism 279.10. Thus, rotation of the crank 278.10 rotates pulley 284 which cause rotation of pulley 288 via belt 290. This causes rod 270.10 to rotate, which causes rods 252.10 and 254.10 to rotate in a like manner as before for raising or lowering the canopy.

It will be appreciated that even more variations are possible within the scope of the invention described herein.

Many variations in the type of actuators to be used are possible. For example, instead of using hydraulic actuators, linear actuators or hand crank actuators, the canopy system may for example use actuators which are pneumatic, comprise spring-type mechanisms, and/or include scissor or rotary mechanisms.

Many variations relating to the mounting of the actuators are possible. For example canopy system 10 as herein described has actuators 54 and 64 that are pivotally connected at ends 58, 68, 62 and 72 according to the embodiment shown in FIGS. 1 to 13. In the alternative ends 58 and 68 may be fixedly connected to the actuator mounts 26 and 28. In another alternative ends 58 and 68 may comprise pivotal connections and ends 62 and 72 may be fixedly connected to the canopy 44.

The frame 35 per se is not required. For example portion 32 of the frame 35 is not necessarily required. Portion 32 may be omitted or be a part of the canopy mount 34 and the system may have separate actuator mounts 26 and 28 only.

Also the actuator mounts 26 and 28 need not extend fully along the side walls 18 and 20, respectively, of the box 14. Index pins, bolts, key ways, and/or any combination thereof, may be used for additionally supporting and securing the actuator mounts to the rest of the system.

The canopy system 10 as shown in FIG. 1 and as herein described provides a canopy mount that includes struts 38 and 41, end wall 36 and cross member 40. However neither struts 38 and 41 nor end wall 36 is required. Rather, the canopy mount 34 may comprise one or more bars or mounting members of some kind having a portion located adjacent to top end 31 of the box 14 and that extends upwards and away from the box 14, from the perspective of FIG. 1. In this case the canopy 44 may further include a front portion opposite rear portion 50 and could be connected to sides 48 and 53, for fully enclosing the canopy 44.

The channels 43, 45, 61, 74 and 80 are made of extruded aluminum in the above examples though this is not required. Frames and channels made of aluminium may provide the advantage of lowering costs and minimizing the weight of the canopy system 10. The channels may each include an aluminium or chrome sleeve facing away from the truck and positioned to cover, for cosmetic purposes, otherwise protruding edges. In the alternative, the channels, and the corresponding ends of the canopy configured to be received by the channels, may for example be made of fiberglass, other types of metal extrusions or plastic.

Many variations in the configuration of the channels are possible. In the embodiment of the canopy system 10 shown in FIGS. 1 to 13, the channels 74 and 80 are connected to the frame 35, as shown in FIG. 6. In the alternative channels may connect to the ends of the sides 48 and 53 of the canopy 44 and face downwards, relative to FIG. 7. Likewise elongate projection portions may extend upwards from the frame 35 and be shaped and positioned to engage with the channels. Referring to FIG. 3, channels 45 and 61 may, instead of being connected to the canopy mount 34, be connected to the canopy 44 along end 49. In this manner strut 38 would be received by the channel located on the canopy 44. Referring to FIG. 6, channel 43, instead of being connected to the canopy mount 34, may be connected to the canopy 44 along the roof 46 shown in FIG. 1. In this case cross member 40 would be received by the channel located on the canopy 44. Thus a portion or all of the gasket channel and opposing section could be reversed: that is, the channel(s) on the stationary portions of the canopy may in the alternative be on the raisable portion of the canopy.

While FIG. 16 does disclose seals 161 with tapered ends 173 and 175 that acts as guides, these ends are not strictly required as, for example, guide bars and tabs may be provided to the channels for a similar effect. The seals in the alternative may further include one or more lateral projections extending from the pair of spaced-apart walls 164 and 166 towards recess 167 to further inhibit water from passing into the interior of the canopy.

The specific channels and gaskets as herein described are not strictly required. Gaskets of other shapes may be used to seal the canopy.

A variety of latching mechanisms may be used, as would be appreciated by one skilled in the art. Also, referring to FIG.

12, the spring 103 may be positioned to bias the pin 102 via protruding end 105 towards the right, from the perspective of the figure, to a closed position. The latching mechanism may thus be self-closing like a door latch on a house. While only one latching mechanism 96 is shown in FIG. 12, the canopy system 10 may employ two or more latching mechanisms. For example the canopy system may include two latching mechanisms located adjacent to the side walls 18 and 20, respectively, near where the side walls 18 and 20 connect with the tailgate 22.

Flange 104 per se of the canopy 44 shown in FIG. 12 is not required. For example aperture 106 may instead extend through a portion of the canopy 44 itself. Where flange 104 is used, it need not extend from rear portion 50 as shown in FIG. 12. Rather flange 104 may extend for example from one of the sides 58 and 53. Also flange 168, shown in FIGS. 17 to 19, need not extend from side 48.4 but rather may extend for example from portion 50.4 of the canopy 44.

All pivot connections, and related moving parts, for the lift mechanisms as described herein may incorporate bushings and/or fixed or swivelling bearings.

The canopy systems as herein described open from the back of the truck towards the front of the truck. However the canopy system may be rotated 90 degrees or 180 degrees relative to the box to enable the canopy to open front to back or from one side to another side. Also the canopy system may have different models and variations to fit different trucks. In a variation, sides 48 and 53 of the canopy 44 and/or end wall 36 of the canopy mount 34 may further include windows. The specific shapes of the canopies as herein described are not strictly required. Canopies of other shapes may be used.

In alternative embodiments there may be many variations in the way the clamps 63 are arranged. For example there may be three or more clamps per side: that is, three or more clamps along actuator mount 26, three or more clamps along actuator mount 28 and there or more clamps along portion 32 of the frame.

For canopy system 10.5, there may be provided one or more rollers or bearings connected to the second end 190 of the lift bar. The guide rail may be in the form of an I-beam or T-shaped track. Alternatively, plastic guide tracks and/or sliders may be used. In a further alternative, plastic slides could be used in conjunction with rollers/bearings.

The canopy system may include an electrical system incorporated therewith. The related electrical wiring may be fused and feature a plug for connecting and disconnecting the electrical system. An up/down control switch, and related apparatus, for actuating the canopy may be located inside the truck cab or on the side of the stationary portion of the canopy inside a box with a lockable access door. A remote control system for actuating the canopy may also be incorporated within the canopy system. Where the canopy system includes an electrical system, a locking mechanism for locking the canopy would not be required, because the gear reduction mechanism within the actuators would inhibit movement of the canopy when the actuators are not engaged and thus ensure that the canopy is kept closed. Any combination of inside and/or exterior lighting may be used. The lighting system may include a lit inside box containing the up/down control switch. Automatic audible and/or visual warning systems may be incorporated into the canopy system for when the canopy is being raised or lowered.

While the invention as herein described is directed to installing the canopy system to an existing vehicle, in the alternative a truck box manufacturer or automaker may be able to adapt the canopy system so as to incorporate it within a custom-built truck or truck box design.

It will be understood by someone skilled in the art that many of the details provided above are by way of example only and are not intended to limit the scope of the invention which is to be determined with reference to the following claims.

What is claimed:

1. A raisable canopy system for a truck having a rear box, the box including a first wall and a second wall opposite the first wall, the walls of the box having top edges, the system comprising:
    a pair of actuator mounts mounted to the first wall and the second wall, respectively, on the top edges of the walls of the box;
    a canopy mount connected to the pair of actuator mounts, the canopy mount being disposed adjacent to one end of the box and extending upwards from the box;
    a canopy shaped to substantially extend over the box, the canopy being pivotally connected to the canopy mount; and
    a pair of actuators pivotally connected to and extending upwards from the pair of actuator mounts, the pair of actuators each pivotally connecting to the canopy, and the pair of actuators being configured to selectively move the canopy from a closed position in which the canopy covers and abuts the box to an open position in which the canopy is angularly spaced-apart above the box.

2. The system as claimed in claim 1 further including u-shaped framing that overlays, extends along and connects to the top edges of theist wall and the second wall, respectively, the framing connecting the canopy mount to the actuator mounts.

3. The system as claimed in claim 2 wherein the canopy mount includes a pair of spaced-apart struts connected to the framing and disposed adjacent to the first wall and the second wall, respectively, and a cross member connected to and extending between the struts.

4. The system as claimed in claim 3 wherein the struts each have a lower end connected to the framing and an upper end connected to the cross member, the lower ends have larger widths relative to the upper ends, the first wall has a horizontal length and the lower ends axe configured to extend to no more than 15% of said horizontal length.

5. The system as claimed in claim 2 wherein the canopy has an outer peripheral edge that is adjacent to the box when the canopy is in the closed position, and wherein the system further includes channels extending along one of the outer peripheral edge and the framing, the other of the outer peripheral edge and the framing having elongate projection portions, the channels being shaped to receive the projection portions for sealably closing the canopy.

6. The system as claimed in claim 5 further including seals disposable within the channels for further sealing the canopy, and wherein the channels include a plurality of drain holes positioned to allow water entering within the channels to drain away from the channels and hence the interior of the box via the drain holes.

7. The system as claimed in claim 6 wherein the seals are u-shaped and have tapered ends configured to facilitate alignment of the channels with the elongate projection portions.

8. The system as claimed in claim 2 wherein the framing connects to the canopy mount and the actuator mounts together.

9. The system as claimed in claim 2 further including clamps that connect the framing to the walls of the box of the truck.

10. In combination, a truck together with the system as claimed in claim 1.

11. The system as claimed in claim 1 wherein each of the actuator mounts has a clamp portion that is c-shaped in cross-section and a screw extending through the clamp portion for clamping the system to the box of the truck.

12. The system as claimed in claim 11 wherein each of the actuator mounts further includes a flange portion that is triangular-shaped in cross-section which abuts the box and supports the actuators.

13. A raisable canopy system for a truck having a rear box, the box including a pair of spaced-apart walls, the system comprising:
- a pair of spaced-apart frames mounted to and overlying the walls, respectively;
- a canopy mount connected to the frames at one end of the box and extending upwards from the box;
- a canopy shaped to substantially extend over the box, the canopy having a roof and being pivotally connected to the canopy mount;
- a pair of lift bars having first ends pivotally connecting to respective ones of the pair of frames and second ends disposed adjacent to the roof of the canopy, the second ends of the lift bars operatively abutting with and being slidable relative to the canopy; and
- a pair of actuators, each having a first end and a second end, the actuators pivotally connecting to the pair of frames at the first ends of the actuators and pivotally connecting to the pair of lift bars at the second ends of the actuators, whereby selective actuation of the actuators causes the second ends of the lift bars to raise and move along adjacent to the roof, which in turn causes the canopy to selectively rise.

14. The system as claimed in claim 13, the canopy having a first end and a second end opposite the first end, and the system further including a pair of spaced-apart guide rails mounted to the canopy and extending generally from a position adjacent to the first end of the canopy towards the second end of the canopy, the first ends of the lift bars engaging with and being slidable along the guide rails.

15. The system as claimed in claim 14 wherein the pair of lift bars pivotally connect to the pair of frames adjacent to one of the first end and the second end of the canopy.

16. The system as claimed in claim 14 wherein the guide rails are u-shaped and have open ends configured to face downwards towards the lift bars and through which the lift bars partially extend, and wherein the system further includes rollers connecting to the respective first ends of the rift bars, the rollers being configured to slidably fit within the guide rails.

17. The system as claimed in claim 13 wherein the first ends of the lift bars are positioned adjacent to the canopy mount.

18. A raisable canopy system for a truck having a rear box, the system comprising:
- a canopy mount connected to one end of and extending upwards from the box;
- a canopy shaped to substantially extend over the box, the canopy being pivotally connected to the canopy mount and having a roof, a first end and a second end opposite the first end;
- a pair of spaced-apart guide rails mounted to the roof of the canopy and extending generally from a position adjacent to the first end of the canopy towards the second end of the canopy;
- a pair of lift bars moveably engageable with the pair of guide rails, respectively, and pivotally connecting to the roof of the canopy near a first one of the first end and the second end of the canopy; and
- a pair of actuators, each having a first end and a second end, the actuators pivotally connecting to the roof of the canopy near a second one of the first end and the second end of the canopy at the first ends of the pair of actuators and pivotally connecting to the pair of lift bars at the second ends of the actuators, whereby selective actuation of the actuators causes the lift bars to raise, move along and push against the guide rails, which in turn causes the canopy to selectively rise.

19. The system as claimed in claim 18, wherein the canopy has a pair of spaced-apart side walls, wherein the roof has a central portion interposed between the side walls and a peripheral portion adjacent to the side walls, wherein the actuators pivotally connect to the central portion of the roof and wherein the lift bars pivotally connect to the peripheral portion of the roof.

20. A raisable canopy system for a truck having a rear box, the box including a pair of spaced-apart walls, the system comprising:
- a pair of spaced-apart frames mounted to and overlying the walls, respectively;
- a canopy mount connected to the frames at one end of the box and extending upwards from the box;
- a canopy shaped to substantially extend over the box, the canopy pivotally connecting to the canopy mount and having a first end and a second end opposite the first end;
- a pair of lift bars pivotally connecting to the pair of frames, respectively, adjacent to one of the first end and the second end of the canopy and extending towards and being movably engageable with the roof of the canopy adjacent to another of the first end and the second end of the canopy;
- a hand crank; and
- a plurality of threaded rods operatively connected at one end to the hand crank and operatively engageable with the lift bars such that selective actuation of the hand crank causes the lift bars to raise, move along and push against the roof of the canopy, which in turn causes the canopy to selectively rise.

* * * * *

UNITED STATES PATENT AND TRADEMARK OFFICE
CERTIFICATE OF CORRECTION

PATENT NO. : 8,757,699 B2  
APPLICATION NO. : 13/153773  
DATED : June 24, 2014  
INVENTOR(S) : Kalack Page 1 of 1

It is certified that error appears in the above-identified patent and that said Letters Patent is hereby corrected as shown below:

In the Claims

Column 20, Line 29-33, Claim 2 should read

The system as claimed in claim 1 further including u-shaped framing that overlays, extends along and connects to the top edges of the first wall and the second wall, respectively, the framing connecting the canopy mount to the actuator mounts.

Column 20, Line 39-44, Claim 4 should read

The system as claimed in claim 3 wherein the struts each have a lower end connected to the framing and an upper end connected to the cross member, the lower ends have larger widths relative to the upper ends, the first wall has a horizontal length and the lower ends are configured to extend to no more than 15% of said horizontal length.

Signed and Sealed this  
Sixth Day of January, 2015

Michelle K. Lee  
*Deputy Director of the United States Patent and Trademark Office*